(12) United States Patent
Conti et al.

(10) Patent No.: US 12,384,126 B2
(45) Date of Patent: Aug. 12, 2025

(54) METHOD FOR BUILDING BELT ASSEMBLIES FOR TYRES FOR VEHICLE WHEELS

(71) Applicant: PIRELLI TYRE S.P.A., Milan (IT)

(72) Inventors: Davide Conti, Milan (IT); Christian De Col, Milan (IT); Gianni Enrico Portinari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 529 days.

(21) Appl. No.: 17/781,369

(22) PCT Filed: Dec. 18, 2020

(86) PCT No.: PCT/IB2020/062176
§ 371 (c)(1),
(2) Date: May 31, 2022

(87) PCT Pub. No.: WO2021/124241
PCT Pub. Date: Jun. 24, 2021

(65) Prior Publication Data
US 2023/0001658 A1    Jan. 5, 2023

(30) Foreign Application Priority Data

Dec. 19, 2019  (IT) .................. 102019000024694
Jun. 18, 2020  (IT) .................. 102020000014677

(51) Int. Cl.
*B29D 30/22*    (2006.01)
*B29D 30/20*    (2006.01)
(Continued)

(52) U.S. Cl.
CPC ........... *B29D 30/22* (2013.01); *B29D 30/242* (2013.01); *B29D 30/2607* (2013.01);
(Continued)

(58) Field of Classification Search
CPC ............... B29D 30/242; B29D 30/246; B29D 2030/204; B29D 2030/202; B29D 30/22
See application file for complete search history.

(56) References Cited

U.S. PATENT DOCUMENTS 3,676,262 A    7/1972 Leblond et al.
3,677,852 A    7/1972 Fleuret et al.
(Continued)

FOREIGN PATENT DOCUMENTS

CN    107471920 A    12/2017
CN    108407551 A    8/2018
(Continued)

OTHER PUBLICATIONS

First Office Action for Chinese Application No. 202080085887.2 filed on Dec. 18, 2020 on behalf of PSEMI Corporation Mail Date: Jan. 12, 2023, 12 pages (English + Original).
(Continued)

*Primary Examiner* — Galen H Hauth
*Assistant Examiner* — Alexander D Booth
(74) *Attorney, Agent, or Firm* — Steinfl + Bruno LLP

(57) ABSTRACT

A method for building belt assemblies for tyres for vehicle wheels is described. The method includes building a crossed belt structure on a forming drum. Depending on the type of tyre to be produced, the method selects whether to build a belt assembly having a cylindrical shaping or a belt assembly having a toroidal shaping. In order to build a belt assembly having a cylindrical shaping, a zero degrees belt layer is deposited on the forming drum in a radially outer position with respect to the crossed belt structure. In order to build a belt assembly having a toroidal shaping, the crossed belt structure is picked up from the forming drum. The crossed belt structure is then toroidally shaped and transferred onto another forming drum. A zero degrees belt
(Continued)

layer is then deposited on the other forming drum in a radially outer position with respect to the toroidally shaped crossed belt structure.

14 Claims, 21 Drawing Sheets

(51) Int. Cl.
    *B29D 30/24* (2006.01)
    *B29D 30/26* (2006.01)
    *B29D 30/70* (2006.01)
(52) U.S. Cl.
    CPC ........ *B29D 30/70* (2013.01); *B29D 2030/204* (2013.01); *B29D 2030/209* (2013.01)

(56) References Cited

U.S. PATENT DOCUMENTS

| | | | |
|---|---|---|---|
| 2008/0087367 | A1 | 4/2008 | Lacagnina et al. |
| 2010/0276067 | A1* | 11/2010 | Marchini ............... B29D 30/22 156/111 |
| 2012/0318460 | A1 | 12/2012 | Popp et al. |
| 2014/0034220 | A1 | 2/2014 | Mancini et al. |

FOREIGN PATENT DOCUMENTS

| | | | |
|---|---|---|---|
| EP | 0503532 | A1 | 9/1992 |
| EP | 1767337 | A2 | 3/2007 |
| JP | H01249429 | A | 10/1989 |
| JP | 3184593 | B2 | 7/2001 |
| JP | 2007185886 | A | 7/2007 |
| JP | 2007185888 | A | 7/2007 |
| JP | 2007530325 | A | 11/2007 |
| JP | 2014097659 | A | 5/2014 |
| JP | 2016203687 | A | 12/2016 |
| JP | 2018065323 | A | 4/2018 |
| KR | 20070091020 | A | 9/2007 |
| KR | 101941962 | B1 | 1/2019 |
| WO | 80/00327 | A1 | 3/1980 |
| WO | 2008/152453 | A1 | 12/2008 |
| WO | 2010/070374 | A1 | 6/2010 |
| WO | 2016/075576 | A1 | 5/2016 |

OTHER PUBLICATIONS

Korean Notice of Allowance for Korean Application No. 10-2022-7019643 filed on Dec. 18, 2020 on behalf of PSEMI Corporation Mail Date: Feb. 1, 2023 5 pages (English + Original).

International Search Report for International PCT Application No. PCT/IB2020/062176 filed on Dec. 18, 2020, on behalf of Pirelli Tyre S.P.A. Mail Date: Jul. 6, 2021. 4 Pages.

Written Opinion for International PCT Application No. PCT/IB2020/062176 filed on Dec. 18, 2020, on behalf of Pirelli Tyre S.P.A. Mail Date: Mail Date: Jul. 6, 2021. 5 Pages.

* cited by examiner

METHOD FOR BUILDING BELT ASSEMBLIES FOR TYRES FOR VEHICLE WHEELS

CROSS REFERENCE TO RELATED APPLICATIONS

The present application is the U.S. national stage of International Application No. PCT/IB2020/062176 filed on Dec. 18, 2020, which, in turn, claims priority to Italian Application No. 102019000024694 filed on Dec. 19, 2019, and Italian Application No. 102020000014677 filed on Jun. 18, 2020.

The present invention relates to a method for building belt assemblies for tyres for vehicle wheels.

A tyre for vehicle wheels generally comprises a carcass structure, a crown structure arranged in radially outer position with respect to the carcass structure and a pair of sidewalls that are the axially outer surfaces of the tyre, with respect to a mid-plane perpendicular to the rotation axis of the same tyre.

The carcass structure comprises at least one carcass ply formed of reinforcing cords incorporated in a matrix of elastomeric material. The carcass ply has opposite end edges respectively engaged with annular anchoring structures. The latter are arranged in the areas of the tyre usually identified by the name "beads" and each of them is usually formed of a substantially circumferential annular insert, or "bead core", on which at least one filling insert is applied, in a radially outer position, the latter being radially tapered moving away from the rotation axis.

Specific reinforcing inserts having the function of improving the transmission of torque to the tyre can be provided at the beads.

In the case of "tubeless" tyres, i.e. without air chamber, a layer of elastomeric material, generally known as "liner", can also be provided in a radially inner position with respect to the carcass structure to provide the necessary impermeability to the inflation air of the tyre. Generally, the liner extends from one bead to the other.

The crown structure comprises a belt structure and, in a radially outer position with respect to the belt structure, a tread band made of elastomeric material.

The belt structure comprises a belt layer, or more belt layers arranged in radial juxtaposition with respect to one another, comprising reinforcing cords having an orientation substantially parallel to the direction of circumferential extension of the tyre (zero degrees belt layer) or, in the case of more belt layers, a crossed orientation. In this last case, said zero degrees belt layer can be provided in a radially outer position with respect to the belt layers having a crossed orientation.

Longitudinal and transversal grooves are typically formed on the tread band, and they are arranged to define a desired tread pattern. Between the tread band and the belt structure a so-called "under-layer of the tread band" can be arranged, made of an elastomeric material having suitable properties for obtaining a stable union of the belt structure with the tread band itself.

The sidewalls are made of elastomeric material and define the axially outer surfaces of the tyre, i.e. the surfaces arranged in the axially outermost position with respect to the annular anchoring structures, the carcass ply(ies), the belt layer(s) and possibly at least one portion of tread band. For example, each sidewall extends from one of the lateral edges of the tread band up to the respective bead annular anchoring structure.

Throughout this description and in the claims, any numerical value is deemed to be preceded by the term "about" to also indicate any numerical value that differs slightly from the one indicated, for example to take into account the dimensional tolerances typical of the field of reference.

The term "elastomeric material" is used to indicate a composition comprising at least one elastomeric polymer and at least one reinforcing filler. Such a composition can also comprise additives like, for example, a cross-linking agent and/or a plasticizer. Thanks to the presence of the cross-linking agent, such a material can be cross-linked by heating, so as to form the final manufactured product.

The term "green tyre" is used to indicate a tyre obtained from the building process and not yet molded and vulcanized.

The term "finished tyre" is used to indicate a tyre obtained by subjecting a green tyre to a molding and vulcanization process.

The term "tyre" is used to indicate a finished tyre or a green tyre.

The terms "axial", "axially", "radial", "radially", "circumferential" and "circumferentially" are used with reference to the tyre or to a forming drum used in the production process of the tyre.

In particular, the terms "axial" and "axially" are used to indicate references/parameters arranged/measured or extending in a direction substantially parallel to the rotation axis of the tyre or of the forming drum.

The terms "radial" and "radially" are used to indicate references/parameters arranged/measured or extending in a direction substantially perpendicular to the rotation axis of the tyre or of the forming drum and lying in a plane comprising such a rotation axis.

The terms "circumferential" and "circumferentially" are used to indicate references/parameters arranged/measured or extending along a circumference that extends around the rotation axis of the tyre or of the forming drum.

The term "structural component" of a tyre is used to indicate any portion of the tyre capable of performing its function or a part thereof. Examples of structural components of the tyre are the following components: the carcass structure, the crown structure, or parts thereof, like liner, under-liner, anti-abrasion inserts, bead core, filling inserts in the area of the bead (and therefore the annular anchoring structures defined by bead cores and respective filling inserts), carcass ply(ies), belt layer(s), belt under-layer, under-layer of the tread band, sidewalls, sidewall inserts, tread band, reinforcing inserts made of textile or metallic material, reinforcing inserts made of elastomeric material etc., or a part thereof.

The term "crossed belt structure" is used to indicate a belt structure comprising at least two belt layers arranged in radial juxtaposition over one another and each including a plurality of textile and/or metallic and/or hybrid parallel reinforcing cords, tilted with respect to the direction of circumferential extension of the tyre (and therefore to an axial mid-plane of the tyre), wherein the reinforcing cords of one belt layer are tilted with respect to said axial mid-plane of the tyre by the same angle and on the opposite side to the reinforcing cords of another belt layer.

The term "belt assembly" is used to indicate an annular assembly comprising a crossed belt structure and a zero degrees belt layer arranged in a radially outer position with respect to the crossed belt structure.

The term "cylindrical shaping" of a belt assembly is used to indicate a building cycle aimed at obtaining a belt assembly having a substantially cylindrical shape.

The term "toroidal shaping" of a belt assembly is used to indicate a building cycle aimed at obtaining a belt assembly having a substantially toroidal shape and a profile in a radial section close to the profile in a radial section of the corresponding finished tyre.

The term "substantially toroidal forming drum" is used to indicate a forming drum the outer surface of which has a profile in a radial section such that, whatever semi-finished product is deposited thereon during the building of a tyre being processed, the semi-finished product takes a shape close to the shape taken in the finished tyre.

The term "tyre being processed" is used to indicate a tyre at any stage of the relative production process that goes from building at least one structural component up to obtaining the finished tyre. For example, a tyre being processed is the one which exits from the working station dedicated to building the belt assembly to proceed towards the working stations dedicated to the deposition on the belt assembly of the possible under-layer of the tread band, of possible reinforcing inserts and of the tread band itself.

The term "functionally independent" is used to indicate the capability of a member or device to perform the function it is provided for in an autonomous manner, i.e. without interacting or cooperating with other members or devices which are provided to perform the same function.

The term "normal operation" is used to indicate the normal operating conditions of a tyre production plant, thus excluding possible starting or stopping transient periods of the plant itself, for example linked to a change of production batch.

The term "cycle time of a building device" is used to indicate the time that elapses between the exit of a tyre being processed from the building device and the exit of the next tyre being processed from the same building device, in normal operating conditions. The cycle time of a building device is therefore given by the sum of the time necessary to load the tyre being processed in the building device, of the time necessary to carry out the building activity, and of the time necessary to unload the tyre being processed from the building device.

The term "total cycle time of a building plant" is used to indicate the time that elapses between the exit of a tyre being processed from the building plant and the exit of the next tyre from the same building plant, in normal operating conditions.

The term "downstream'Y"head" and "upstream"/"tail" are used with reference to a direction of movement. Therefore, assuming for example a direction of movement from left to right, a "downstream" or "head" position with respect to any reference element indicates a position to the right of said reference element and an "upstream" or "tail" position indicates a position to the left of said reference element.

The production cycles of a tyre provide that, after a building process of a green tyre in which the various structural components of the tyre itself are built and assembled, the green tyres are transferred to a molding and vulcanization line wherein a molding and vulcanization process adapted to define the structure of the finished tyre according to a desired geometry and tread pattern is carried out.

The building of the structural components of the tyres and the subsequent assembly thereof is carried out on suitable forming drums. For example, the carcass structure can be built on a first forming drum, known as first stage drum, and the crown structure can be built on a second forming drum, known as auxiliary or second stage drum. The assembly of the carcass structure to the crown structure can be carried out on the first forming drum, in which case the first stage drum takes the name of single stage or "unistage" drum, or on a different forming drum, known as shaping drum.

An example of a plant for producing green tyres is described in WO2010/070374. Such a plant comprises:
  at least one building line for building the carcass structure on a first forming drum, such a building line comprising a plurality of working stations arranged according to a sequential series;
  at least one building line for building the crown structure on at least one second forming drum, such a building line comprising a plurality of working stations arranged according to a sequential series; and
  at least one shaping and assembling station of the tyre being processed adapted to shape the carcass structure on the first forming drum by assembling it to the crown structure of the tyre being processed.

Examples of first and/or second stage forming drums which can be used in a tyre production process like the one described in the aforementioned WO2010/070374 are described in WO2008/152453 and US2012/0318460. In both cases they are radially contractable/expandable forming drums having a substantially cylindrical shape.

The forming drums described in the cited documents are widely used in the production cycles of tyres in which a cylindrical shaping of the belt assemblies is carried out.

The Applicant has observed that, for example in the production cycles of racing or high-performance tyres, it is necessary to be able to adequately control the deformations to which the green tyre is subjected during the molding and vulcanization process, in order to provide the tyre with the desired reactivity and driving precision. In order to be able to do this, it is advisable, before actuating the molding and vulcanization process, to provide for a toroidal shaping such as to give the belt assembly a substantially toroidal shape that is as close as possible to the shape of the finished tyre.

With the aim of making a technologically and operatively flexible production plant, so as to reduce the manufacturing costs of the plant and of the devices and apparatuses thereof and the spaces occupied by such devices and apparatuses, the Applicant has deemed that it was advisable to identify a solution suitable for carrying out, by the same belt assembly building device, both a cylindrical shaping of the belt assembly and a toroidal shaping of the belt assembly, each time choosing which of the two types of shaping has to be carried out depending on the type of tyre to be produced.

The Applicant has observed that such a solution could provide for building the belt assembly on a substantially cylindrical forming drum when a cylindrical shaping of the belt assembly has to be carried out, and on a substantially toroidal forming drum when a toroidal shaping of the belt assembly has to be carried out.

According to the Applicant, however, it would be extremely difficult to be able to automatically (i.e. not manually) join the end portions of the belt layers of the crossed belt structure if such belt layers (each of which being defined by a semi-finished product shaped like a substantially flat strip cut to size) are deposited on a substantially toroidal forming drum.

The Applicant has thus deemed that it was preferable to identify an alternative solution that provides for building the crossed belt structure on a substantially cylindrical forming drum not only in the case of a cylindrical shaping of the belt assemblies but also in the case of a toroidal shaping of the belt assemblies, using the same forming drum for the subsequent deposition of the zero degrees belt layer in the case of a cylindrical shaping of the belt assemblies and a different forming drum for the subsequent deposition of the zero degrees belt layer in the case of a toroidal shaping of the belt assemblies. Indeed, this last operation can be carried out on a forming drum having any shape, even toroidal, as no joins need to be made.

The Applicant has finally found that it is possible to provide for a building cycle of the belt assembly having a first part of the cycle, dedicated to building the crossed belt structure, in which a forming drum having a substantially cylindrical shape is used both when a cylindrical shaping of the belt assemblies is carried out and when a toroidal shaping of the belt assemblies is carried out, and a second part of the cycle, dedicated to the deposition of the zero degrees belt layer, in which when a cylindrical shaping of the belt assemblies is carried out the aforementioned substantially cylindrical forming drum continues to be used, whereas when a toroidal shaping of the belt assemblies is carried out, the crossed belt structure is picked up from the substantially cylindrical forming drum and transferred onto another forming drum after having been toroidally shaped, to then proceed with the deposition of the zero degrees belt layer on the toroidally shaped crossed belt structure.

The present invention therefore relates to a method for building a belt assembly for a tyre for vehicle wheels.

Preferably, it is provided that a crossed belt structure is built on a substantially cylindrical first forming drum.

Preferably, it is selected, depending on the type of tyre to be produced, whether building a belt assembly having a cylindrical shaping or a belt assembly having a toroidal shaping.

Preferably, in order to build a belt assembly having a cylindrical shaping the method comprises depositing at least one zero degrees belt layer on said first forming drum in a radially outer position with respect to said crossed belt structure.

Preferably, in order to build a belt assembly having a toroidal shaping the method comprises picking up said crossed belt structure from said first forming drum.

Preferably, in order to build a belt assembly having a toroidal shaping the method comprises toroidally shaping said crossed belt structure.

Preferably, in order to build a belt assembly having a toroidal shaping the method comprises transferring said toroidally-shaped crossed belt structure onto a second forming drum.

Preferably, in order to build a belt assembly having a toroidal shaping the method comprises depositing at least one zero degrees belt layer on said second forming drum in a radially outer position with respect to said toroidally-shaped crossed belt structure.

The Applicant believes that the method according to the invention makes it possible to carry out both a cylindrical shaping of the belt assemblies and a toroidal shaping of the belt assemblies by the same building device, thereby minimizing the number of devices and apparatuses used and the spaces occupied by such devices and apparatuses. This is due to the fact that the crossed belt structure is built on a substantially cylindrical forming drum, both when a cylindrical shaping of the belt assembly is carried out and when a toroidal shaping of the belt assembly is carried out.

Moreover, thanks to the fact that when a toroidal shaping of the belt assembly is carried out the zero degrees reinforcing layer is deposited on a crossed belt structure that has been previously toroidally shaped, it is possible to automatically (i.e. not manually) and without any difficulty join the end portions of the belt layers of the crossed belt structure.

The present invention can have at least one of the preferred features described hereinafter.

Preferably, said crossed belt structure is built on said substantially cylindrical first forming drum in a first working area. This is the case both when a cylindrical shaping of the belt assembly is carried out and when a toroidal shaping of the belt assembly is carried out.

Once the crossed belt structure has been built on the first forming drum different provisions are foreseen depending on whether a cylindrical shaping of the belt assembly or a toroidal shaping of the belt assembly has to be carried out.

Preferably, said at least one zero degrees belt layer is deposited on said first forming drum (to build a belt assembly having a cylindrical shaping) or on said second forming drum (to build a belt assembly having a toroidal shaping) in a second working area.

Preferably, said second working area is arranged downstream of said first working area with reference to a first direction of movement.

Preferably, when a toroidal shaping of the belt assembly has to be carried out said crossed belt structure is toroidally shaped in a first service area.

Preferably, said first service area is arranged downstream of said second working area with reference to said first direction of movement.

Preferably, in order to build a belt assembly having a cylindrical shaping said first forming drum is moved along said first direction of movement from said first working area to said second working area.

Preferably, in order to build a belt assembly having a cylindrical shaping said first forming drum is moved along said first direction of movement from said second working area to a second service area.

Preferably, said second service area is arranged downstream of said first service area with reference to said first direction of movement.

Preferably, when a belt assembly having a cylindrical shaping has to be built, during the movement from said second working area to said second service area the first forming drum passes through said first service area without stopping there.

Preferably, in order to build a belt assembly having a toroidal shaping said first forming drum is moved along said first direction of movement from said first working area to said first service area passing through said second working area without stopping.

Preferably, when a belt assembly having a toroidal shaping has to be built, said second forming drum is moved from said first service area to said second working area along a second direction of movement opposite to said first direction of movement. Such a movement therefore occurs along a path in part identical to that of the first forming drum, with a consequent optimization of the spaces.

Preferably, after having moved said second forming drum from said first service area to said second working area, said second forming drum is moved from said second working area along said first direction of movement passing through said first service area without stopping.

Preferably, before moving said second forming drum from said first service area to said second working area said second forming drum is moved from a second service area to said first service area along said second feeding direction.

Preferably, said second service area is arranged downstream of said first service area with reference to said first direction of movement.

Preferably, toroidally shaping said crossed belt structure comprises transferring said crossed belt structure from said first forming drum to an annular holding member.

Preferably, said annular holding member is arranged in said first service area.

Preferably, toroidally shaping said crossed belt structure comprises arranging said second forming drum in a radially inner position with respect to said annular holding member.

Preferably, toroidally shaping said crossed belt structure comprises, after having arranged said second forming drum in a radially inner position with respect to said annular holding member, radially expanding said second forming drum until it is brought to an expanded condition.

Preferably in said expanded condition said second forming drum is in contact with said crossed belt structure and deforms said crossed belt structure until it takes a toroidal shape.

Preferably, transferring said crossed belt structure from said first forming drum to said annular holding member comprises arranging said first forming drum in a radially inner position with respect to said annular holding member.

Preferably, transferring said crossed belt structure from said first forming drum to said annular holding member comprises radially contracting said annular holding member until it is brought into contact with said crossed belt structure.

Preferably, transferring said crossed belt structure from said first forming drum to said annular holding member comprises, after having radially contracted said annular holding member, radially contracting said first forming drum leaving said crossed belt structure associated with said annular holding member.

Preferably, said second forming drum is substantially toroidal.

In preferred embodiments, the first forming drum is radially contractable/expandable.

In the aforementioned preferred embodiments or in further preferred embodiments, the second forming drum is radially contractable/expandable.

In the aforementioned preferred embodiments or in further preferred embodiments, the annular holding member is radially contractable/expandable.

Further features and advantages of the present invention will become clearer from the following detailed description of a preferred embodiment thereof, made with reference to the attached drawings.

Figure 1:
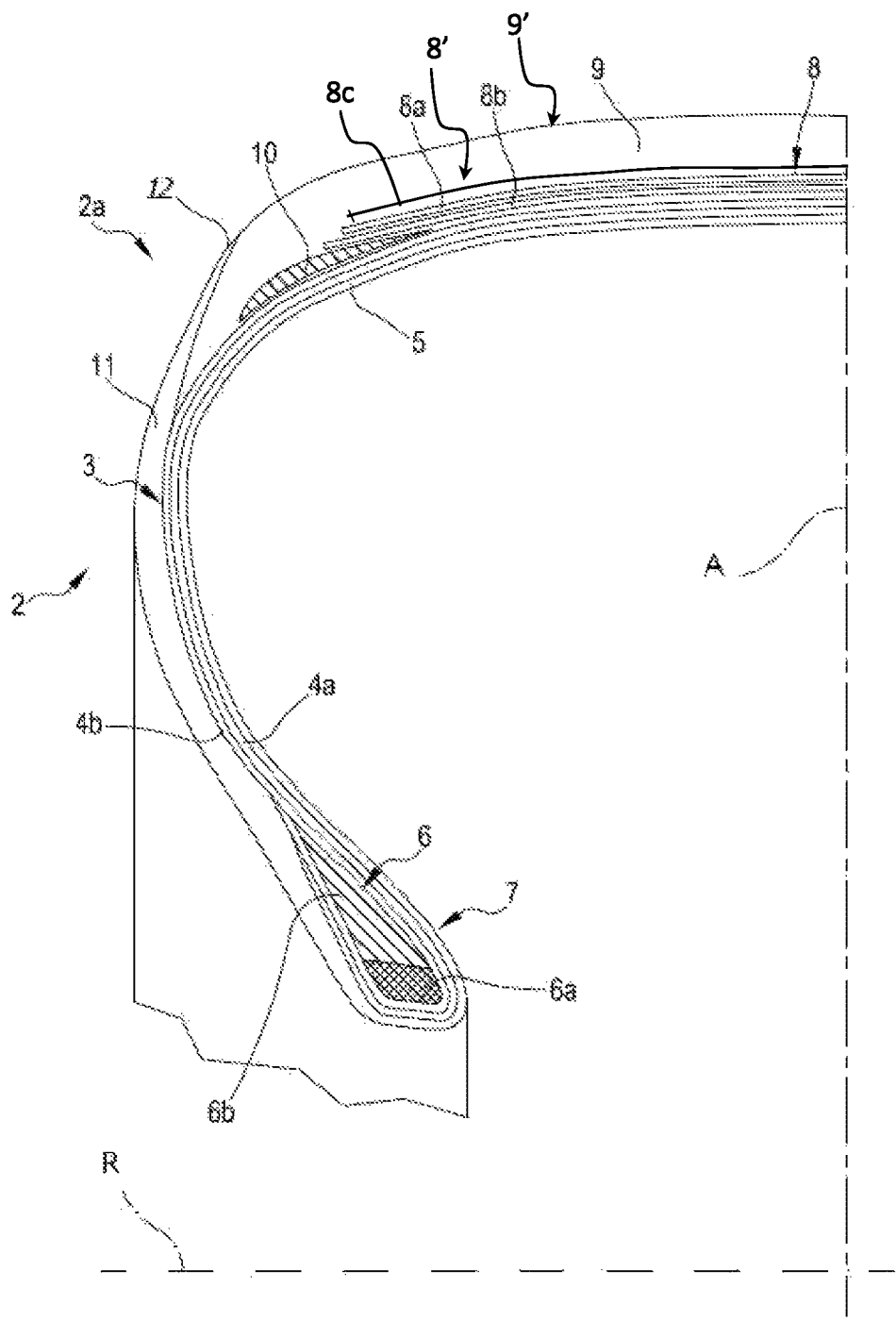
FIG. 1 is a schematic radial half-section view of a tyre that can be made by a process and a plant wherein the method of the invention is carried out.

In FIG. 1, an example of a tyre that can be produced in a plant for producing tyres for vehicle wheels is indicated with reference numeral 2. Such a tyre can be produced by carrying out the method of the present invention.

Figure 2:
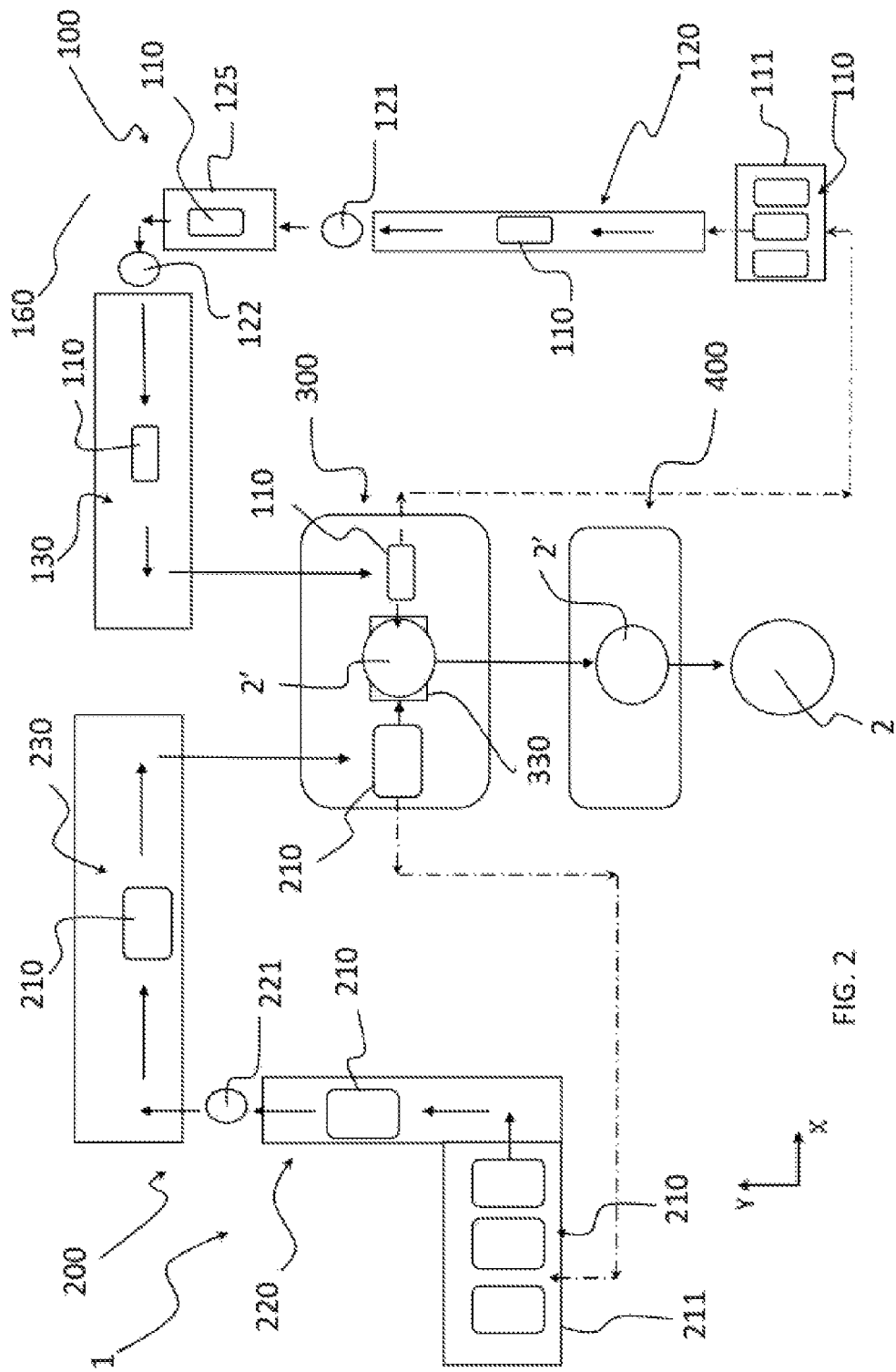
FIG. 2 is a schematic top view of a plant for producing tyres for vehicle wheels wherein an embodiment of the method of the invention is carried out.

The tyre 2 has a mid-plane A perpendicular to the rotation axis R thereof (in FIG. 2 the position of the rotation axis R with respect to the section of the tyre 2 is shown in an indicative and schematic manner). The mid-plane A divides the tyre 2 into a first axial half 2a and a second axial half. For the sake of simplicity of illustration, FIG. 2 shows only the first axial half 2a of the tyre 2, the other half being substantially a mirror image of the first axial half 2a (except for the tread pattern that may not be symmetrical with respect to the aforementioned mid-plane A).

The tyre 2 substantially comprises a carcass structure 3 having one or two carcass plies 4a, 4b. A layer of impermeable elastomeric material or so-called liner 5 is applied in a radially inner position with respect to the carcass ply(ies) 4a, 4b.

Two annular anchoring structures 6 (only the one of the axial half 2a is shown in FIG. 2) are engaged, in axially opposite positions (with respect to the mid-plane A), to respective end edges of the carcass ply(ies) 4a, 4b. Each of the two annular anchoring structures 6 comprises a so-called bead core 6a carrying, in a radially outer position, an elastomeric filler 6b. The two annular anchoring structures 6 are integrated close to areas usually identified with the name of "beads" 7 (only the one of the axial half 2a of which is shown in FIG. 2), at which the engagement between the tyre 2 and a respective mounting rim usually occurs.

A crown structure 9' is arranged in a radially outer position with respect to the carcass structure 3, the crown structure 9' comprising a belt assembly 8' and a tread band 9 arranged in a radially outer position with respect to the belt assembly 8'.

The belt assembly 8' comprises a crossed belt structure 8 comprising two radially juxtaposed belt layers 8a, 8b, and a zero degrees belt layer 8c arranged in a radially outer position with respect to the crossed belt structure 8.

The crossed belt structure 8 can be associated with so-called "under-belt inserts" 10, each arranged between the carcass ply(ies) 4a, 4b and one of the axially opposite end edges of the crossed belt structure 8.

Two sidewalls 11, each extending from the corresponding bead 7 to a corresponding lateral edge of the tread band 9, are applied in axially opposite positions (with respect to the mid-plane A) on the carcass ply(ies) 4a, 4b. The assembly of the portion of each sidewall 11 close to the respective lateral edge of the tread band 9 and of each portion of the tread band 9 close to the respective sidewall 11 is known as shoulder 12 of the tyre 2.

FIG. 2 shows a plant 1 for producing tyres 2 for vehicle wheels wherein an embodiment of the method of the invention is carried out.

The plant 1 comprises a carcass structures building line 100, a crown structures building line 200, a shaping and assembling machine 300 for obtaining a green tyre 2' and a molding and vulcanization station 400 for obtaining the finished tyre 2.

In a normal operation of the plant 1, the carcass structures building line 100 comprises a plurality of working stations (like for example the one indicated below with reference numeral 125) comprising respective building devices configured to build a plurality of carcass structures on respective forming drums 110 picked up from a first drum storage area 111.

Similarly, the crown structures building line 200 comprises a plurality of working stations (like for example the one illustrated in FIGS. 3-17) comprising respective building devices configured to build a plurality of crown structures on respective forming drums 210 picked up from a second drum storage area 211.

Preferably, the forming drums 110 are substantially cylindrical.

Instead, as to the forming drums 210, they are substantially cylindrical in the case in which a cylindrical shaping of the belt assembly has to be carried out or substantially toroidal in the case in which a toroidal shaping of the belt assembly has to be carried out.

Hereinafter, reference will always be made to forming drums 210 having a substantially toroidal shape, unless when expressly stated otherwise.

The carcass structures building line 100 comprises a first path 120 comprising building devices configured to deposit on the forming drum 110 a first part of structural components of the carcass structure. The first path 120 of the carcass structures building line 100 comprises, for example:
- a station configured to apply a liner;
- a station configured to apply an under-liner;
- at least one station configured to apply a carcass ply;
- an optional station configured to apply metallic and/or textile reinforcements;
- an optional station configured to apply under-belt inserts.

The carcass structures building line 100 also comprises a second path 130 comprising building devices configured to build on the forming drum 110 a second part of structural components of the carcass structure.

The second path 130 of the carcass structures building line 100 comprises, for example:
- a station configured to apply anti-abrasion inserts by wrapping in a spiral a continuous elongated element around the first stage forming drum 110;
- an optional station configured to apply at least one portion of sidewalls by wrapping in a spiral a continuous elongated element around the forming drum 110.

Preferably, the first path 120 of the carcass structures building line 100 is substantially rectilinear.

Preferably, the second path 130 of the carcass structures building line 100 is substantially rectilinear and perpendicular to the first path 120.

In a corner area between the first path 120 and the second path 130 of the carcass structures building line 100 a working station 125 configured to form the beads of the tyre is arranged.

The carcass structures building line 100 also comprises a first transfer device 121 configured to transfer the forming drum 110 from the first path 120 to the beads formation station 125 and a second transfer device 122 configured to transfer the forming drum 110 from the beads formation station 125 to the second path 130.

Each of such transfer devices 121, 122 can comprise an anthropomorphous robot (for example a robotized arm having at least 6 movement axes) or a non-anthropomorphous Cartesian movement device, which allows movements according to three Cartesian axes X, Y, Z and, preferably, rotation around at least one, more preferably two of said Cartesian axes X and Y. The axes X and Y are indicated in FIG. 2, the axis Z being perpendicular to the axes X and Y.

Preferably, each forming drum 110 can be moved among the various working stations of the carcass structures building line 100 in a sequence which is the same as or different from the spatial sequence of such working station.

Preferably, each forming drum 110 is moved by a trolley (not shown) along the first path 120 of the carcass structures building line 100. The trolley is preferably capable of moving, driven by a suitable motor, along suitable guides (preferably rectilinear) in two opposite directions of travel.

The building of the first part of components of the carcass structure is preferably carried out along the first path 120 of the carcass structures building line 100 while the forming drum 110 is associated with a pair of axially opposite support rings (not shown).

The forming drum 110 is dissociated from the aforementioned pair of support rings in the beads formation station 125 and along the second path 130 of the carcass structures building line 100.

The crown structures building line 200 comprises a first path 220 comprising building devices configured to build on the forming drum 210 a first part of structural components of the crown structure.

The first path 220 of the crown structures building line 200 comprises, for example:
- an optional station configured to apply under-belt inserts (such a station is provided unless it is already comprised in the first path 120 of the carcass structures building line 100);
- at least one belt assembly building station;
- an optional station configured to apply an under-layer.

The crown structures building line 200 also comprises a second path 230 comprising building devices configured to build a second part of structural components of the crown structure.

The second path 230 of the crown structures building line 200 comprises for example:
- at least one station configured to apply a tread band by wrapping in a spiral a continuous elongated element around the forming drum 210;
- an optional station configured to apply at least one portion of sidewalls by wrapping in a spiral a continuous elongated element around the forming drum 210. This last station is at least provided either in said second path 130 of the carcass structures building line 100 or in said second path 230 of the crown structures building line 200.

The crown structures building line 200 also comprises a drum transfer device 221 configured to transfer the forming drum 210 from the first path 220 to the second path 230.

The drum transfer device 221 can comprise an anthropomorphous robot (for example a robotized arm with at least 6 movement axes) or a non-anthropomorphous Cartesian movement device, which allows movements according to three Cartesian axes X, Y, Z and, preferably, rotation around at least one, more preferably two of said Cartesian axes X and Y.

Preferably, each forming drum 210 can be moved among the various working stations of the crown structures building line 200 in a sequence which is the same as or different from the spatial sequence of such working stations.

Preferably, the first path 220 of the crown structures building line 200 is substantially rectilinear.

More preferably, the first path 220 of the crown structures building line 200 is substantially parallel to the first path 120 of the carcass structures building line 100.

Preferably, the second path 230 of the crown structures building line 200 is substantially rectilinear and perpendicular to the first path 220.

The shaping and assembling machine 300 is configured to sequentially shape, one at a time, the carcass structures as they arrive from the carcass structures building line 100, and to assemble them to the respective crown structures as they arrive from the crown structures building line 200, so as to obtain respective green tyres 2'. In the specific example illustrated herein, the shaping and assembling machine 300 is configured to shape the carcass structures and to assemble them to the respective crown structures on a shaping drum 330. Therefore, it operates on carcass structures and crown structures which have been dissociated from the respective forming drums 110 and 210. Such forming drums 110 and 210 are moved to return to the respective storage areas 111 and 211.

The built green tyres 2' which exit from the shaping and assembling machine 300 are transferred to the molding and vulcanization station 400 wherein a molding and vulcanization process configured to define the structure of the tyre according to a desired geometry and tread pattern is carried out, thus obtaining the finished tyres 2.

With reference to FIGS. 3-17, the crown structures building line 200 comprises a belt assembly building device 201. Preferably, such a device 201 is arranged at the first path 220 of the crown structures building line 200.

The belt assembly building device 201 comprises a trolley 21 moveable on a substantially rectilinear track 21a. The track 21a is arranged so as to obtain a movement of the trolley 21 along a rectilinear direction of movement A, which is preferably parallel to the first path 220 of the crown structures building line 200, and along a direction of movement B opposite to the direction of movement A.

As described hereinafter, during the movement thereof the trolley 21 supports a substantially cylindrical forming drum 25 in order to build thereon a belt assembly or only part thereof, depending on whether a cylindrical shaping of the belt assembly has to be carried out (in which case the trolley 21 always supports only the substantially cylindrical forming drum 25) or a toroidal shaping of the belt assembly has to be carried out (in which case the trolley 21 supports the substantially cylindrical forming drum 25 for a first part of the belt assembly building process and the substantially toroidal forming drum 210 for the remaining part of the belt assembly building process).

The forming drums 25 and 210 are radially contractable/expandable. Both of them comprise a plurality of angular sectors that are radially moveable in a synchronous manner. The angular sectors of the forming drum 25 are shaped so as to provide the forming drum 25 with a substantially cylindrical geometry whatever the radial dimension thereof, whereas the angular sectors of the forming drums 210 are shaped so as to provide the forming drum 210 with a substantially toroidal geometry whatever the radial dimension thereof.

The belt assembly building device 201 comprises a first working area W1 arranged downstream of a starting position P0 of the trolley 21 with reference to the direction of movement A and a second working area W2 arranged downstream of the first working area W1 with reference to the direction of movement A. The starting position P0 can also be defined in the first working area W1.

The first working area W1 comprises a crossed belt structure building device 22. For this purpose, the first working area W1 comprises a first operative station W1a comprising a deposition apparatus 22a configured to deposit a first belt layer having a plurality of first reinforcing cords tilted with a first orientation and a second operating station W1b arranged downstream of the first operative station W1a with reference to the direction of movement A and comprising a deposition apparatus 22b configured to deposit a second belt layer having a plurality of second reinforcing cords tilted with a crossed orientation with respect to the orientation of the aforementioned first cords.

The second working area W2 comprises a deposition device 23 configured to deposit a zero degrees belt layer.

The belt assembly building device 201 comprises, downstream of the second working area W2 with reference to the direction of movement A, a first service area S1.

Figure 18:
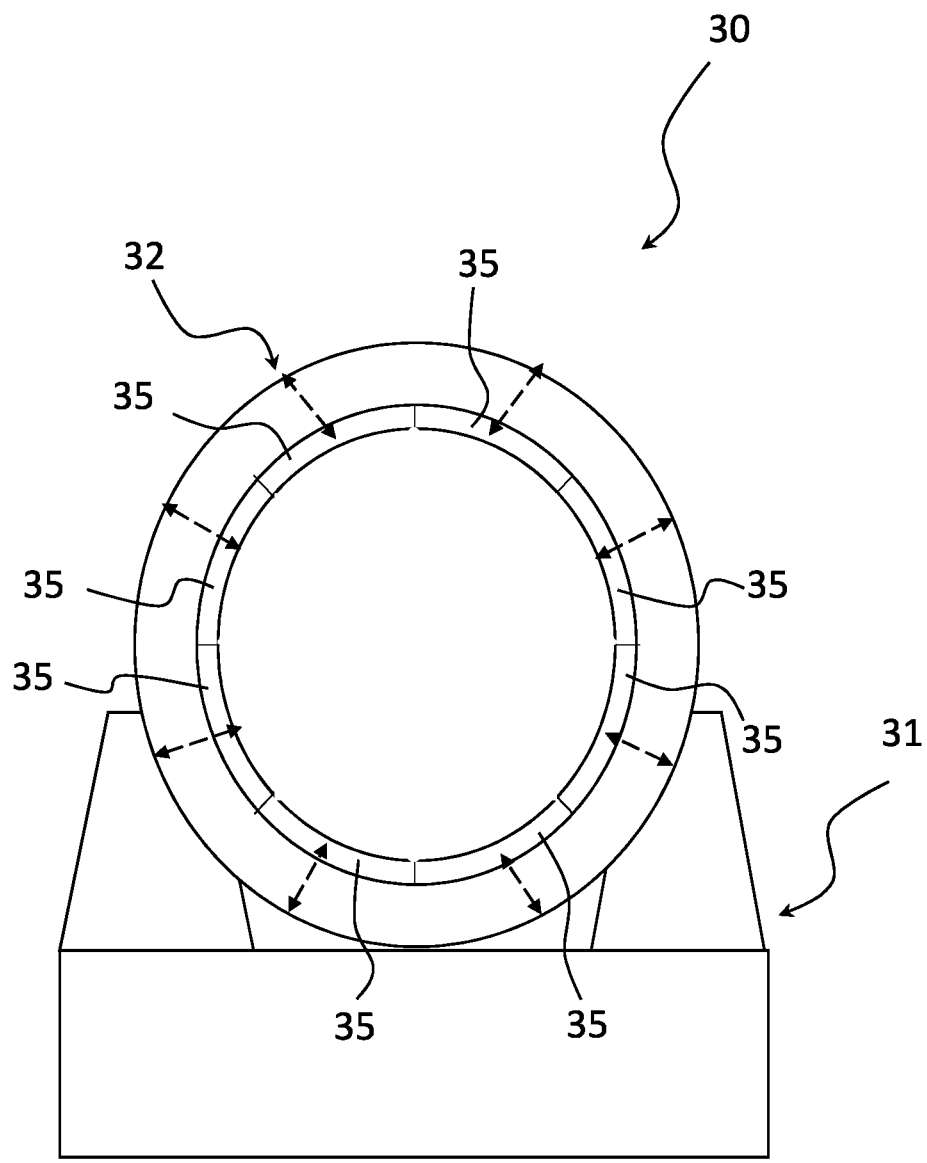
FIG. 18 is a schematic front view of an annular holding member provided in the building line of FIGS. 3-17.

The first service area S1 comprises an annular holding member 30, shown in greater detail in FIG. 18.

The annular holding member 30 comprises a base block 31 and an annular body 32 fixedly associated with the base block 31.

The annular body 32 comprises a plurality of angular sectors 35 (eight in the specific example shown in FIG. 18) circumferentially adjacent to one another and radially moveable in a synchronous manner, preferably upon receipt of a suitable electrical or pneumatic command, between a radially outermost operating position and a radially innermost non-operating position. Due to the possibility of movement of the angular sectors 35 the annular holding member 30 is therefore radially contractable/expandable.

In FIG. 18 the angular sectors 35 are shown in their non-operating position. Such a non-operating position corresponds to the configuration of maximum radial contraction of the annular holding member 30.

With reference to FIGS. 3-17, the belt assembly building device 201 also comprises, downstream of the first service area 51 with reference to the direction of movement A, a second service area S2.

Two support members 41 and 45 are provided in the second service area S2. The support member 41 is configured to support a first forming drum (for example the forming drum 25 shown in FIGS. 19 and 20), whereas the support member 45 is configured to support a second forming drum (for example the forming drum 210 shown in FIGS. 19 and 20).

Figure 19:
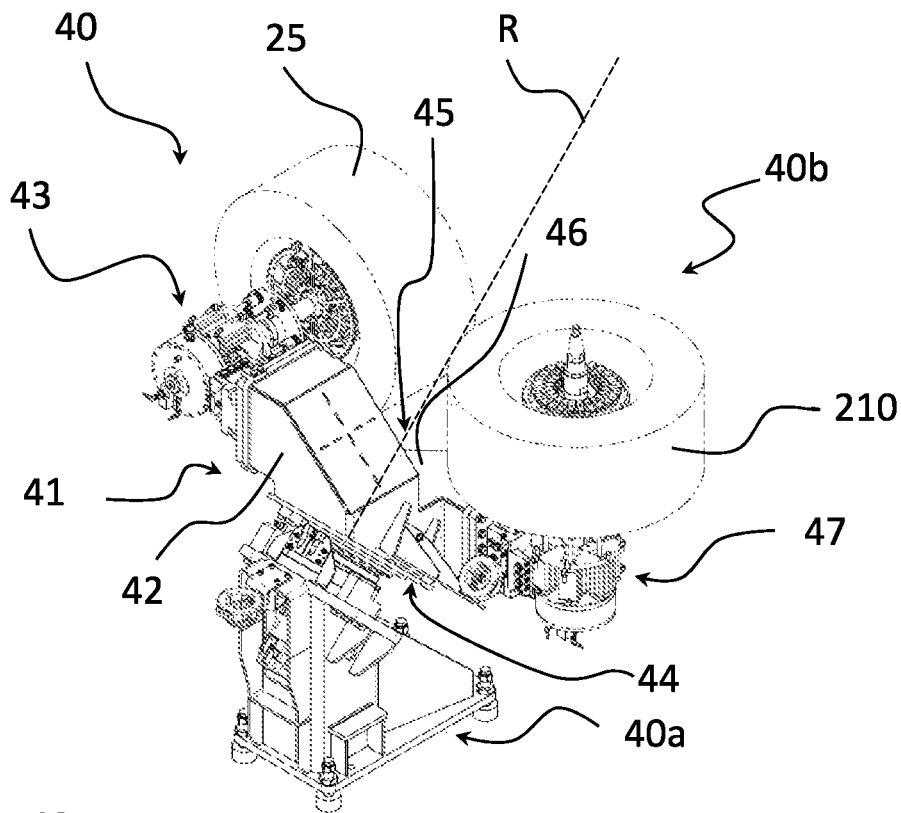
FIGS. 19-20 are schematic perspective views of a manipulator provided in the building line of FIGS. 3-17, in two different operative configurations thereof.
Figure 20:
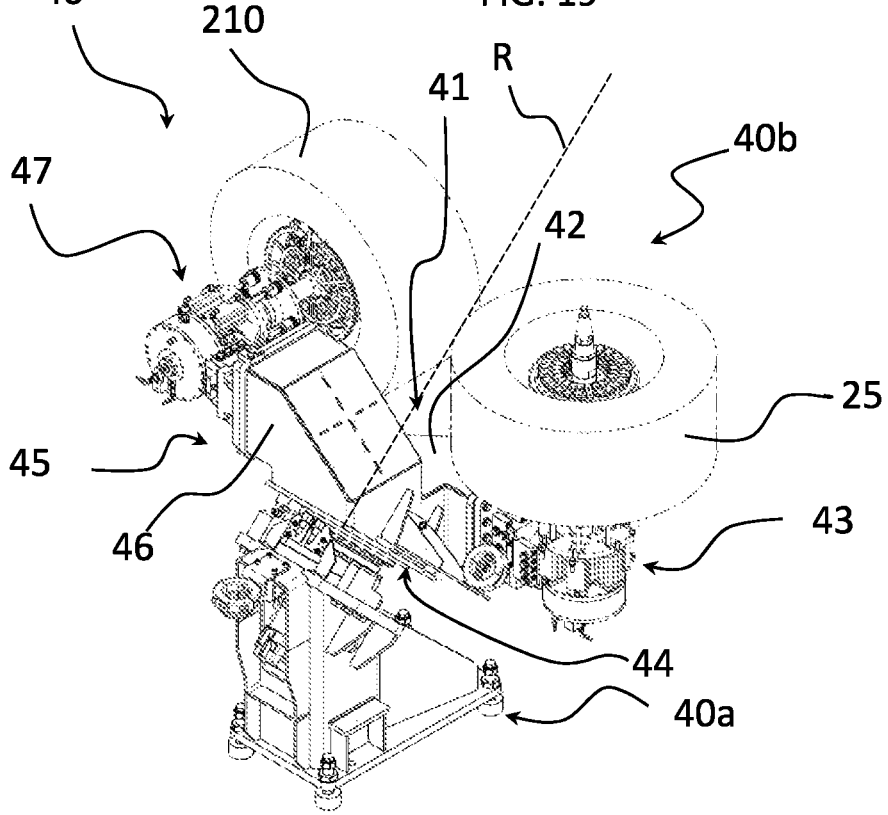

In the particular embodiment shown in FIGS. 19 and 20, the two support members 41, 45 are part of a single manipulator 40.

The manipulator 40 is irremovably arranged in the second service area S2, i.e. when it is used it always remains in the same position with respect to the ground.

The manipulator 40 comprises a base frame 40a stably positioned on the ground and a moveable group 40b rotatable with respect to the base frame 40a about a rotation axis R which is oblique with respect to the ground. In particular, the rotation axis R is tilted by an angle equal to 45° with respect to the ground.

The moveable group 40b is associated with a service surface 44 of the base frame 40a. Such a service surface is tilted by an angle equal to 45° with respect to the ground.

The two support members 41, 45, are fixedly associated with the moveable group 40b, so that the rotation of the moveable group 40b with respect to the base frame 40a about the rotation axis R causes the rotation of the support members 41, 45, about the rotation axis R. Such a rotation can be driven by a motor assembly not visible in the figures. The angle of rotation can be set as desired.

Each support member 41, 45 comprises a respective support arm 42, 46 and a respective mounting axis. When the support member 42, 46 supports a respective forming drum the mounting axis thereof coincides with the rotation axis of the respective forming drum.

The two support arms 42, 46 extend along directions substantially perpendicular to one another and are configured to support the forming drums so that the mounting axis of one of the two support members 41, 45 (and therefore the rotation axis of one of the two forming drums) is arranged along a substantially horizontal direction and the mounting axis of the other support member 41, 45 (and therefore the rotation axis of the other forming drum) is arranged along a substantially vertical direction.

In the operative configuration shown in FIG. 19, the support arm 42 supports the substantially cylindrical forming drum 25 so that the support member 41 is in a loading/unloading position and the rotation axis of the forming drum 25 (and therefore the mounting axis of the support member 41) is arranged along a horizontal direction, whereas the support arm 46 supports the substantially toroidal forming drum 210 so that the support member 45 is in a waiting position and the rotation axis of the forming drum 210 (and therefore the mounting axis of the support member 45) is arranged along a vertical direction.

In the operative configuration shown in FIG. 20, the moveable group 40b has rotated by 180° about the rotation axis R. In this configuration the support members 41, 45 have swapped their position, so that the support arm 42 supports the substantially cylindrical forming drum 25 so that the support member 41 is in the aforementioned waiting position and the rotation axis of the forming drum 25 is arranged along the aforementioned vertical direction, whereas the support arm 46 supports the substantially toroidal forming drum 210 so that the support member 45 is in the aforementioned loading/unloading position and the rotation axis of the forming drum 210 is arranged along the aforementioned horizontal direction.

Each forming drum 25, 210 is supported by the respective support arm 42, 46 by a respective damping device 43, 47 capable of compensating for possible axial movements of the forming drum 25, 210.

Preferably, each damping device 43, 47 comprises a plurality of pneumatic cylinders, at least some of which are functionally independent from the others so as to allow a different degree of compensations depending on whether the forming drum 25, 210 is arranged with its rotation axis extending along a horizontal or vertical direction.

As already stated, the belt assembly building device 201 makes it possible to carry out both a cylindrical shaping of the belt assembly and a toroidal shaping of the belt assembly.

Figure 3:
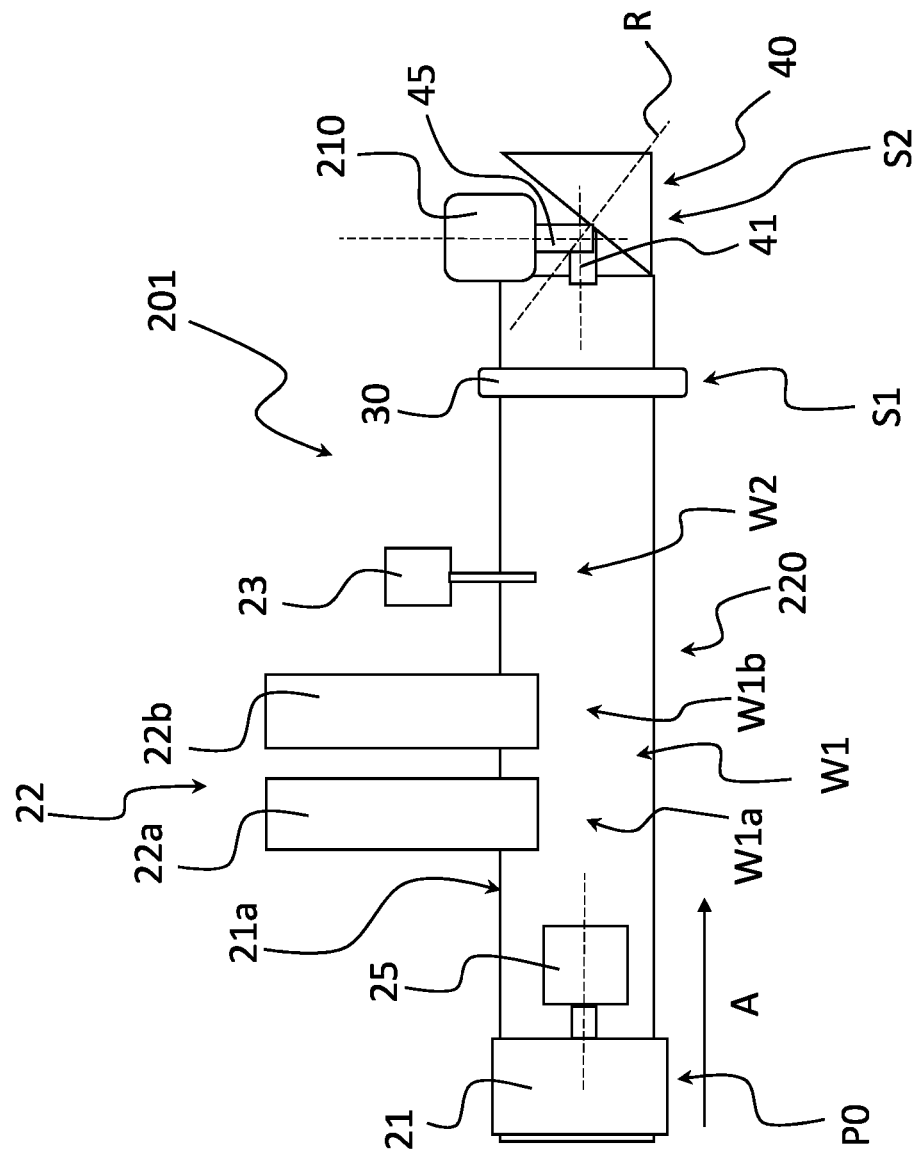
FIGS. 3-17 are schematic top views of a belt assembly building line of the plant of FIG. 2 in various operative configurations thereof taken during a toroidal shaping of the belt assembly according to the method of the invention.

When a toroidal shaping of the belt assembly has to be carried out, the belt assembly building device 201 is configured to take the operative configuration shown in FIG. 3, wherein the trolley 21 is in its starting position P0 (or in the first working area W1 in the case in which the starting position P0 is defined in the first working area W1) and supports a substantially cylindrical forming drum 25. In this operative configuration, the support arm 42 of the manipulator 40 is oriented so that the support member 41 is arranged in the aforementioned loading/unloading position (and therefore the mounting axis of the support member 41 is oriented along a horizontal direction), whereas the support arm 46 is oriented so that the support member 45 is arranged in the aforementioned waiting position (and therefore the mounting axis of the support member 45 is oriented along a vertical direction) and supports a substantially toroidal forming drum 210, as shown in FIG. 19.

Thereafter, the trolley 21 with the forming drum 25 is moved along the direction of movement A until the forming drum 25 is brought to the first working area W1. Such movement is not actuated when the starting position P0 is defined in the first working area W1.

Figure 4:
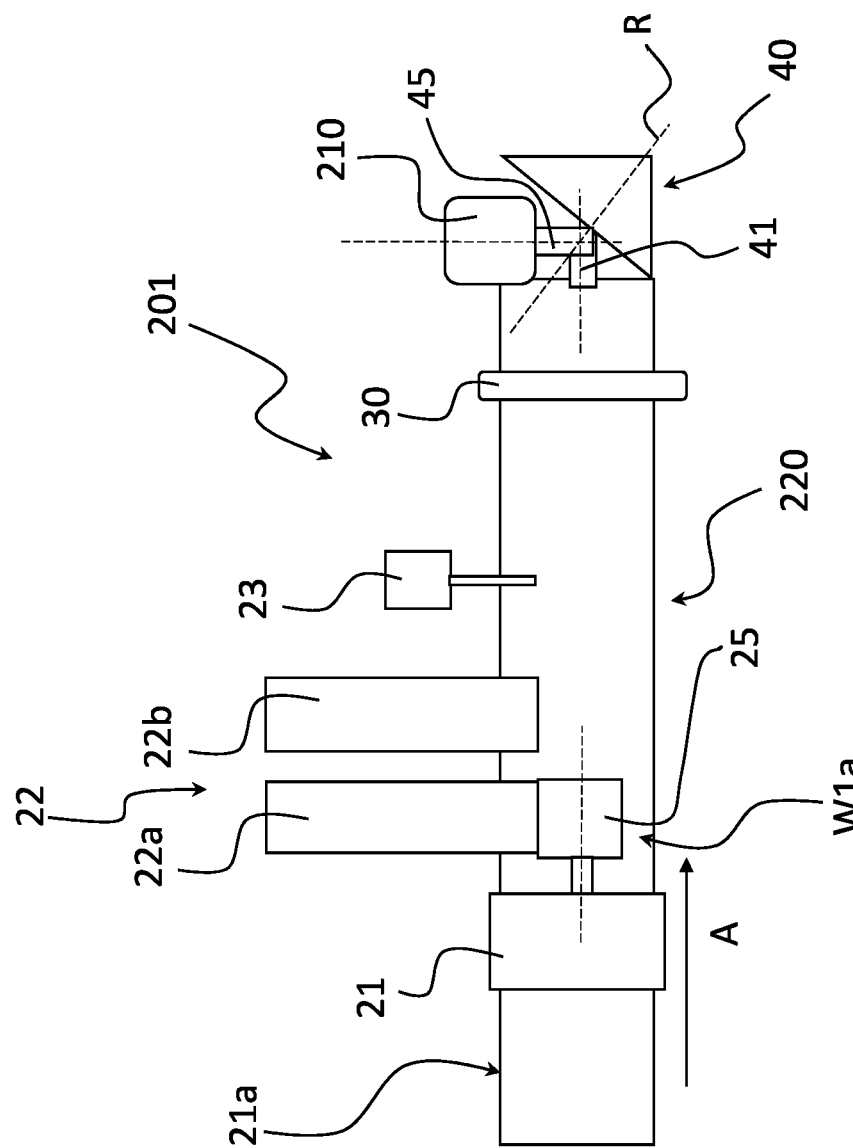

As shown in FIG. 4, the trolley 21 is stopped when the forming drum 25 is at the first operative station W1a, where a first belt layer, like for example the belt layer 8a of the tyre 2 of FIG. 1, is deposited on the forming drum 25 by the deposition apparatus 22a.

Figure 5:
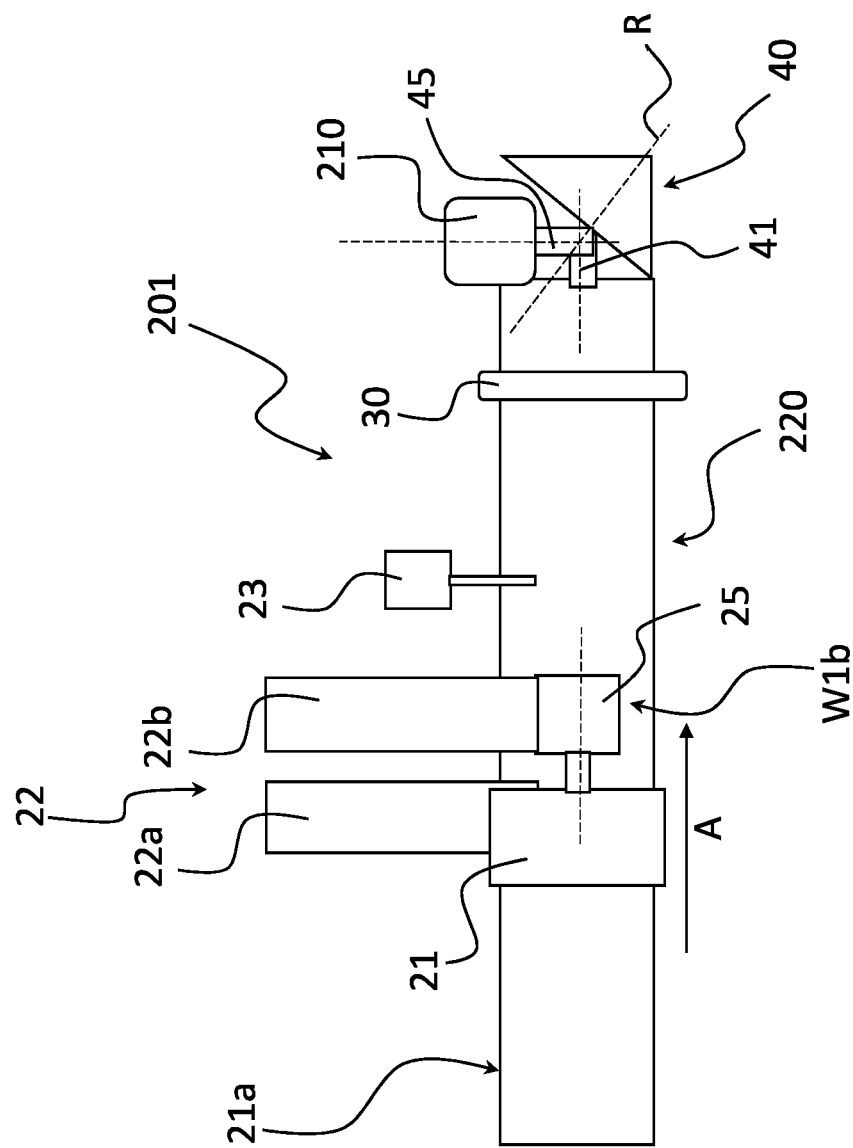

As shown in FIG. 5, the trolley 21 is subsequently moved along the direction of movement A and stopped when the forming drum 25 is at the second operative station W1b, where a second belt layer, like for example the belt layer 8b of the tyre 2 of FIG. 1, is deposited on the forming drum 25 by the deposition apparatus 22b in a radially outer position with respect to the first belt layer, thus building on the forming drum 25 a crossed belt structure, like for example the crossed belt structure 8 of the tyre 2 of FIG. 1.

Figure 6:
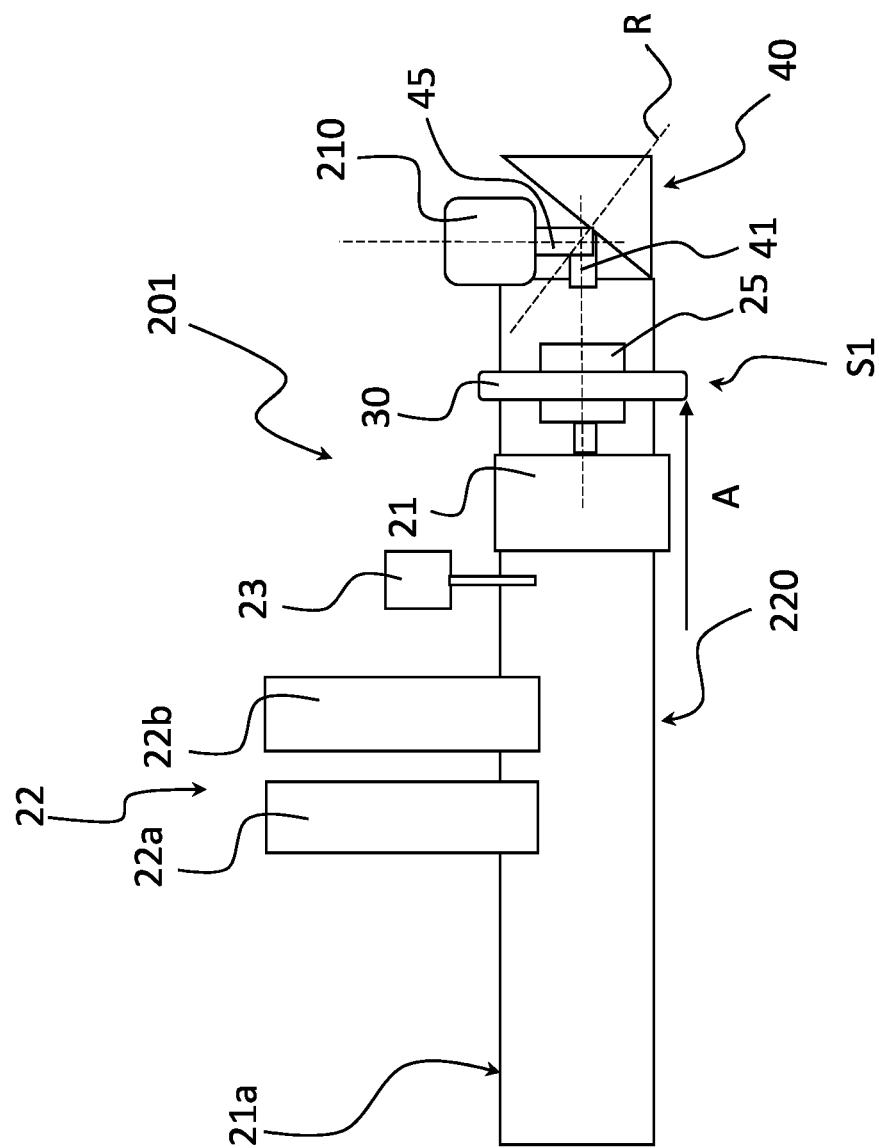

As shown in FIG. 6, the trolley 21 is subsequently moved along the direction of movement A and stopped when the forming drum 25, carrying the crossed belt structure, reaches the first service area S1 and is arranged in a radially inner position with respect to the annular holding member 30.

The crossed belt structure is then transferred from the forming drum 25 to the annular holding member 30. Such transferal comprises at first the radial contraction of the annular holding member 30 through a synchronous radial movement of the angular sectors 35 until the angular sectors 35 contact the crossed belt structure and, thereafter, the radial contraction of the forming drum 25 through a synchronous radial movement of the relative angular sectors.

Figure 7:
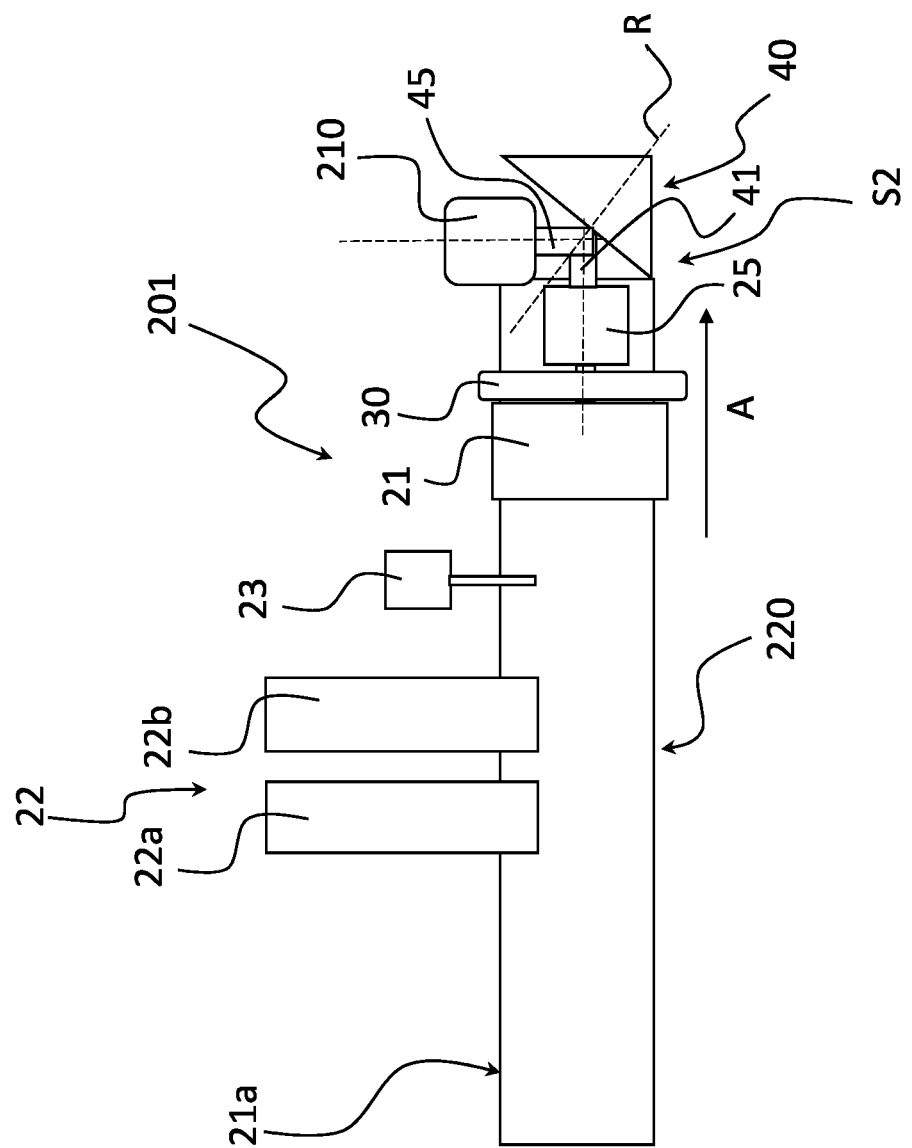

At this point the crossed belt structure remains fixedly connected to the annular holding member 30 and the trolley 21 is moved along the direction of movement A to bring the forming drum 25, without the crossed belt structure thereon, to the second service area S2, where it is transferred to the first support member 41, as shown in FIG. 7.

Figure 8:
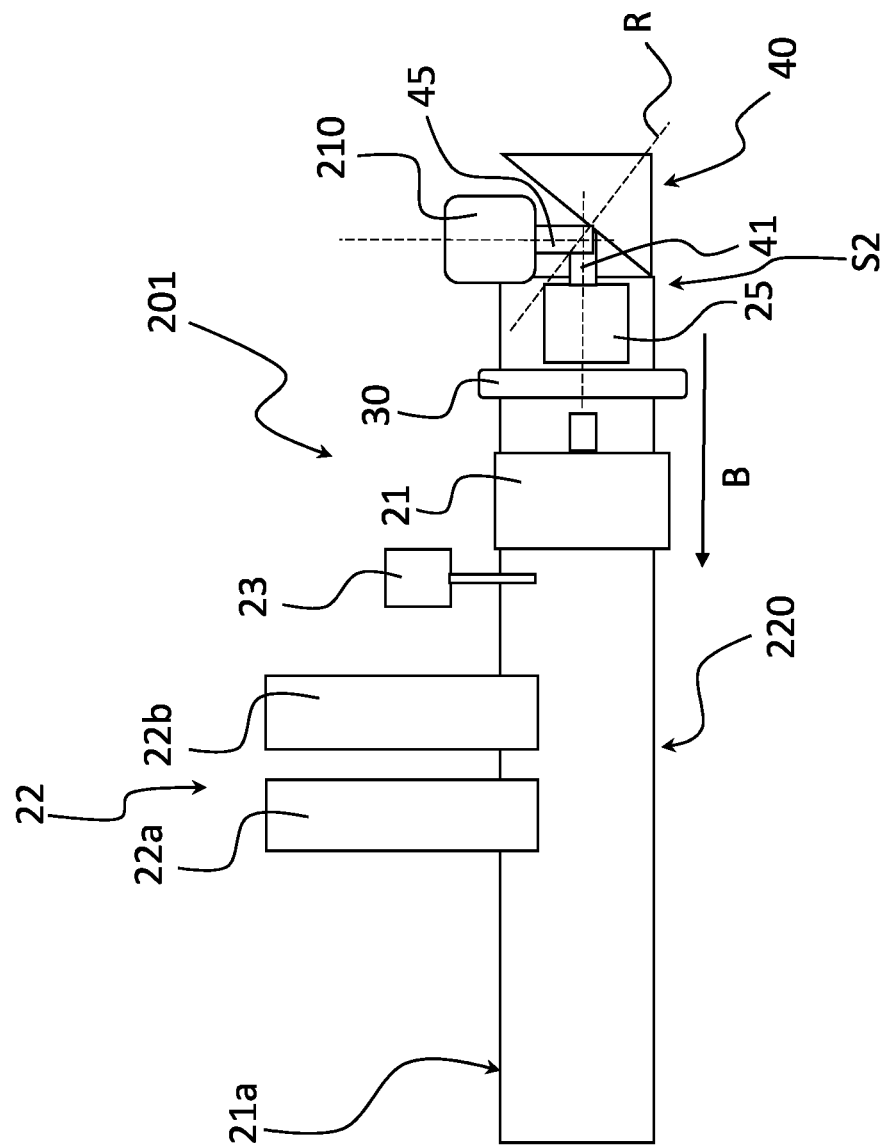

Thereafter, as shown in FIG. 8, the trolley 21 is moved along the direction of movement B so as to move away from the second service area S2.

Figure 9:
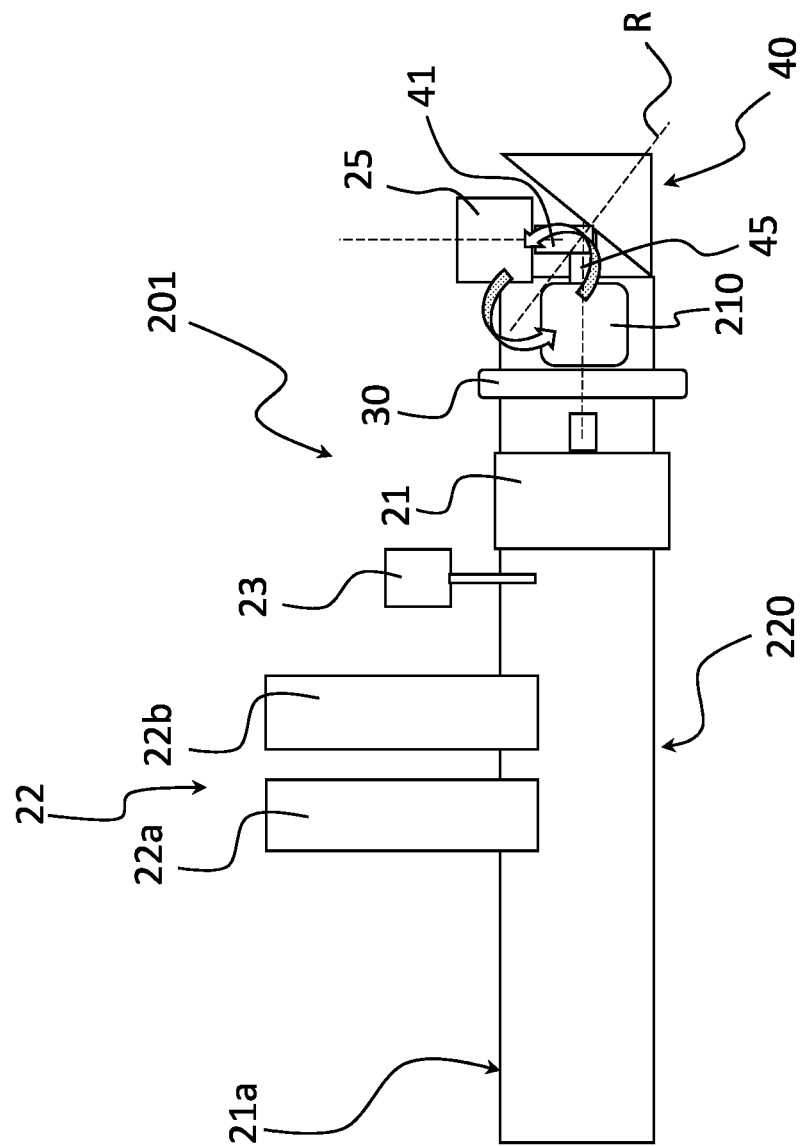

As shown in FIG. 9, at this point the moveable group 40b of the manipulator 40 is driven in rotation about the rotation axis R by an angle of 180°. Such a rotation causes a rotation of the support member 41 about the rotation axis R until it is brought to the waiting position originally occupied by the support member 45 and, simultaneously, a rotation of the support member 45 about the rotation axis R until it is brought to the loading/unloading position originally occupied by the support member 41. The forming drum 25 thus has its rotation axis oriented along a vertical direction and the forming drum 210 has its axis oriented along a horizontal direction, as shown in FIG. 20.

Figure 10:
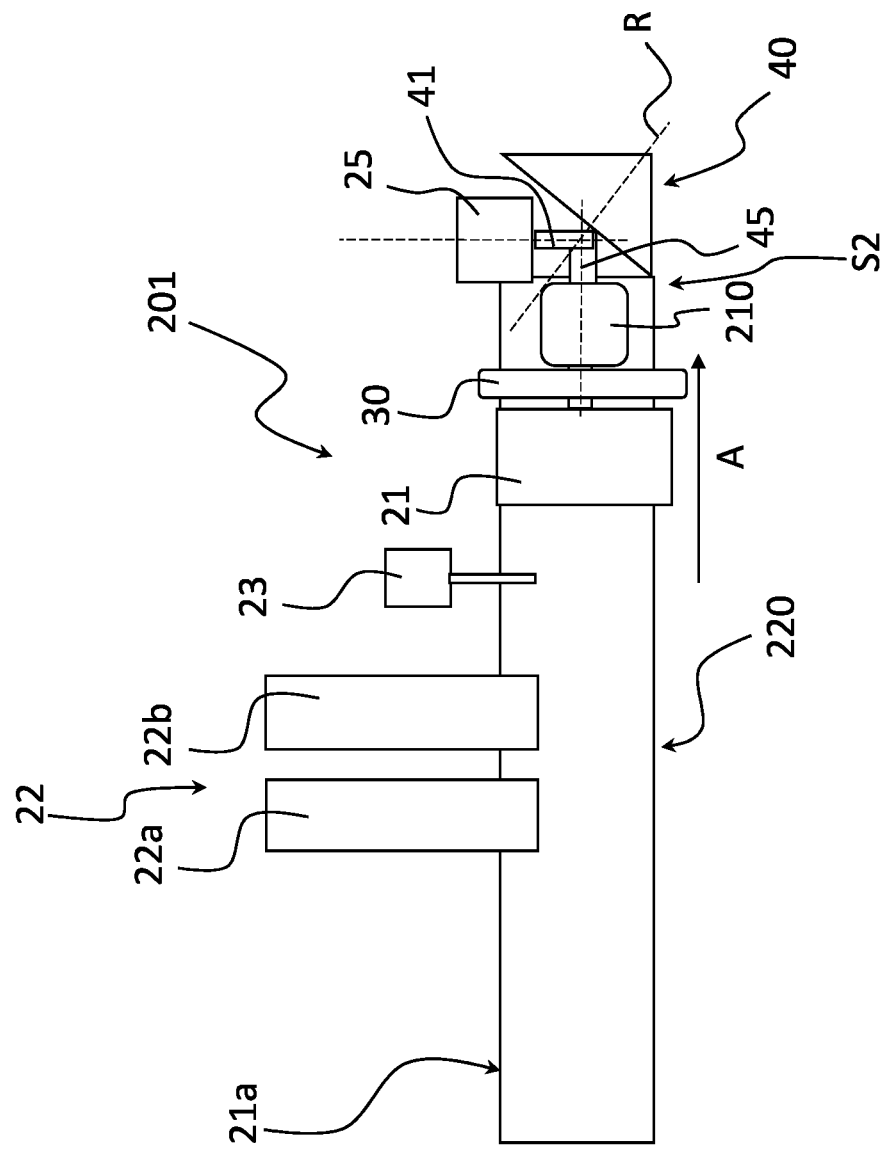

Thereafter, as shown in FIG. 10, the trolley 21 is moved along the direction of movement A so as to pick up the forming drum 210 from the support member 45.

Figure 11:
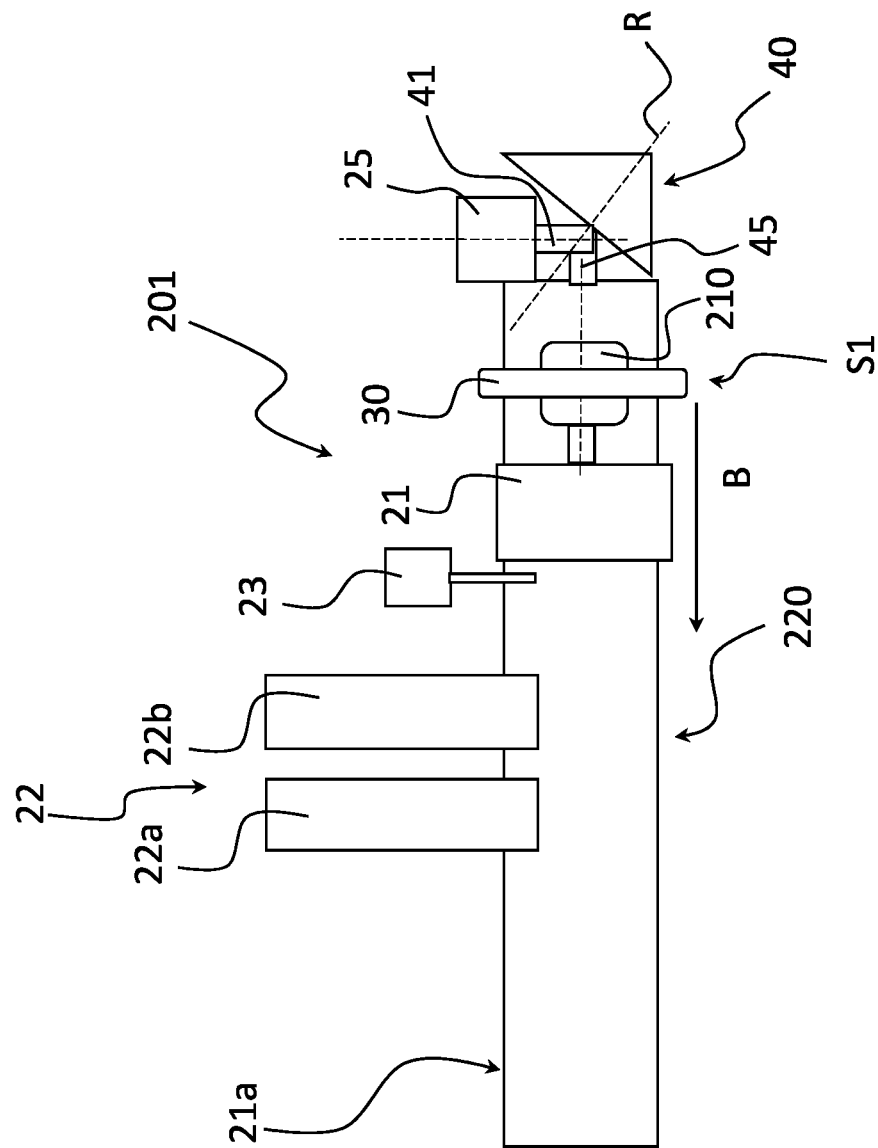

Thereafter, as shown in FIG. 11, the trolley 21 is moved along the direction of movement B until the forming drum 210 is arranged in the first service area 51, in a radially inner position with respect to the annular holding member 30.

The crossed belt structure is then transferred from the annular holding member 30 to the forming drum 210. Such a transfer comprises the radial expansion of the forming drum 210 through a synchronous radial movement of its angular sectors until such angular sectors bring the forming drum 210 to take an expanded condition in which the aforementioned angular sectors are in contact with the crossed belt structure supported by the annular holding member 30. In order to facilitate the aforementioned transfer it is a radial expansion of the annular holding member 30 can be provided when the forming drum 210 has taken to the aforementioned expanded condition. The radial expansion of the annular holding member 30 can also be at least in part simultaneous with the radial expansion of the forming drum 210.

Preferably, the forming drum 210 remains in the aforementioned expanded condition up to the end of the crown structure building cycle.

Figure 12:
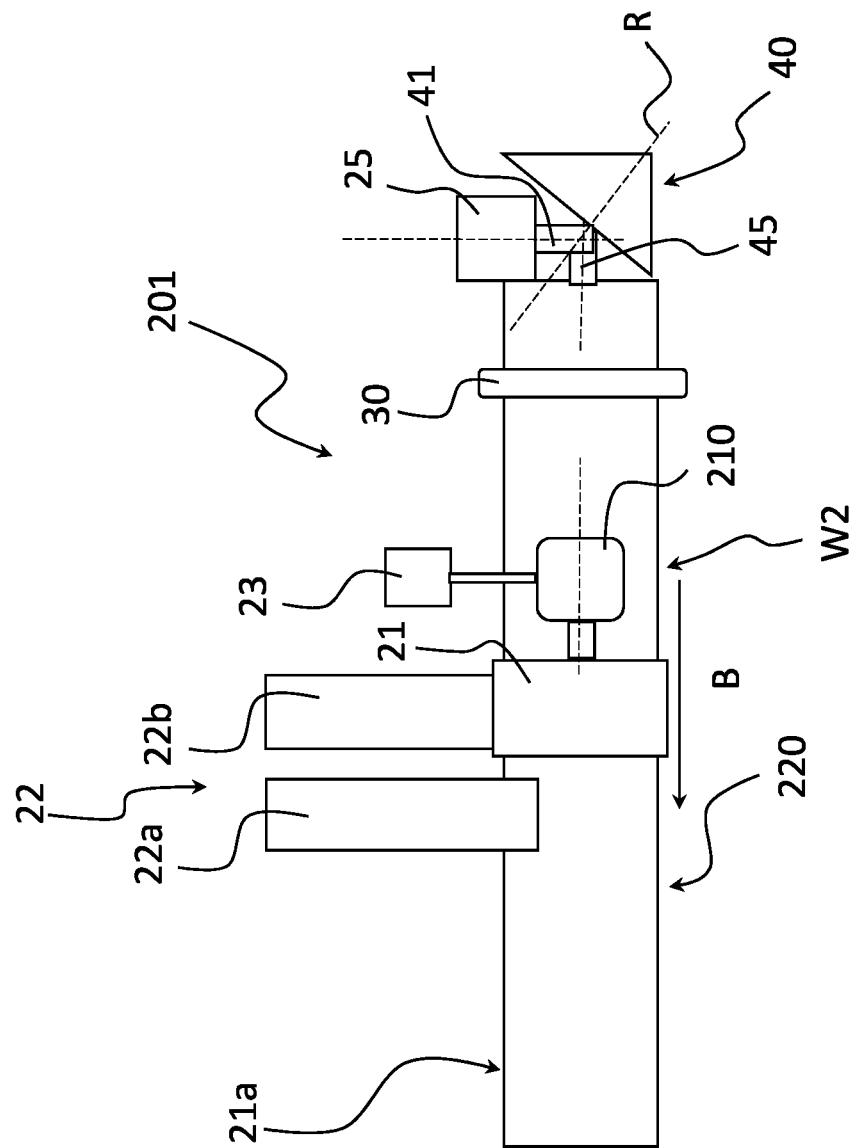

Once the crossed belt structure has been transferred to the forming drum 210, as shown in FIG. 12, the trolley 21 is moved along the direction of movement B to bring the forming drum 210, with the crossed belt structure thereon, to the second working area W2, where the zero degrees belt layer, like for example the zero degrees belt layer 8c of the tyre 2 of FIG. 1, is deposited on the forming drum 210, in a radially outer position with respect to the crossed belt structure. In this way, the desired toroidal shaping of the belt assembly, like for example the belt assembly 8' of the tyre 2 of FIG. 1, is obtained.

Figure 13:
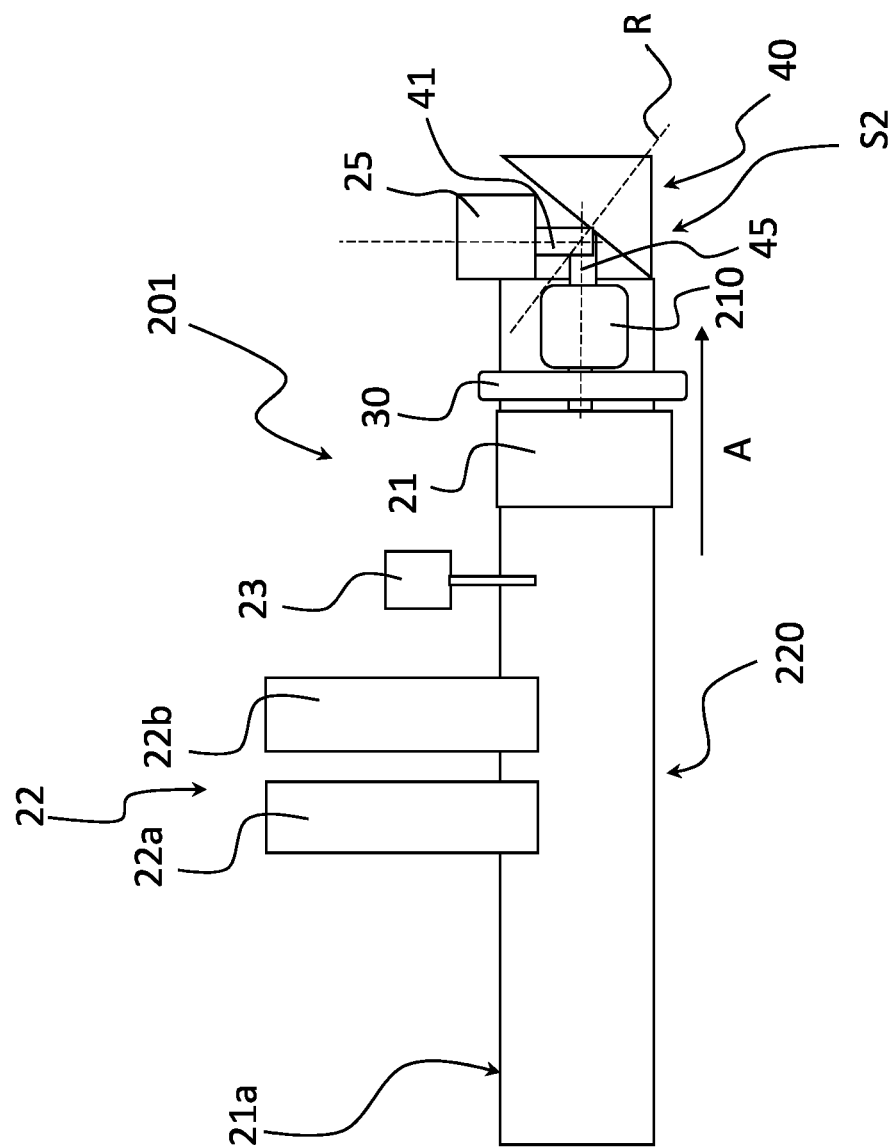

Thereafter, as shown in FIG. 13, the trolley 21 is moved along the direction of movement A to bring the forming drum 210, with the belt assembly thus formed thereon, to the second service area S2, where it is transferred to the second support member 45.

Figure 14:
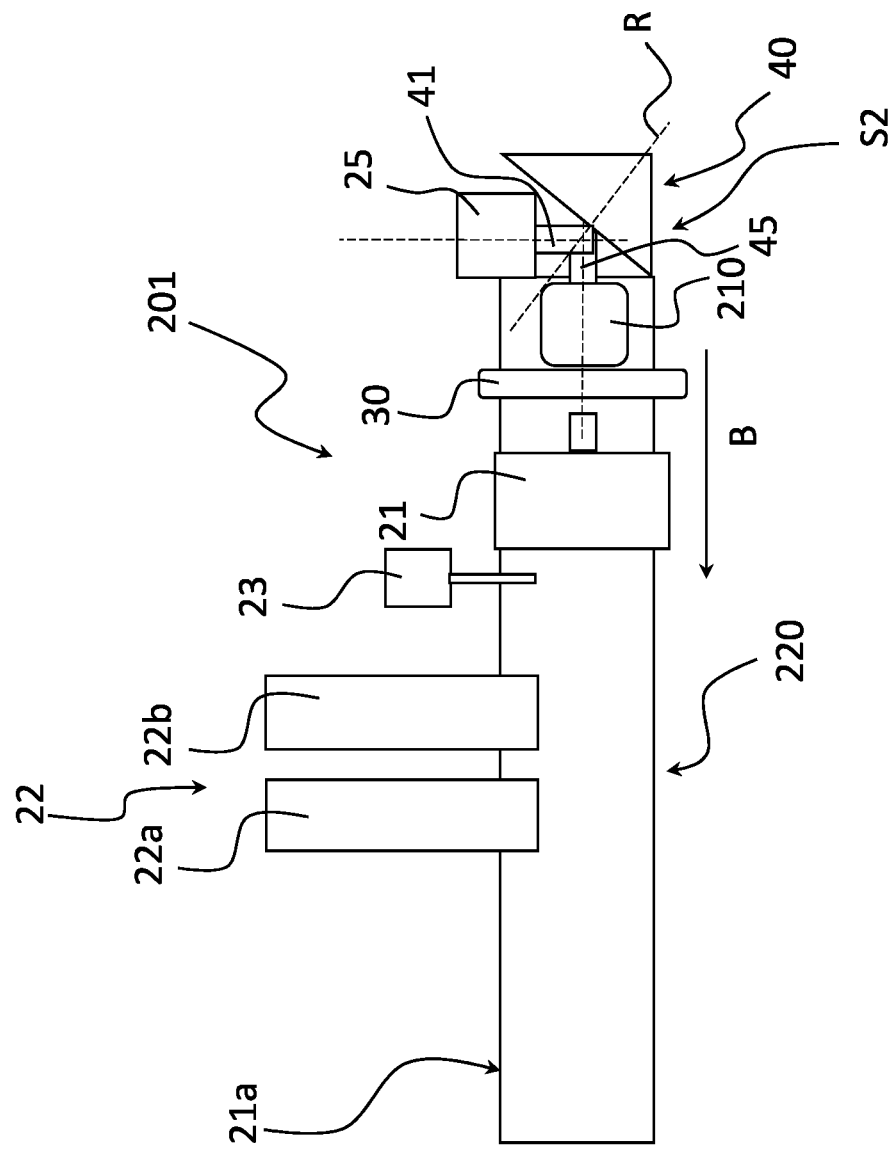

The trolley 21 is subsequently moved along the direction of movement B so as to move away from the second service area S2, as shown in FIG. 14.

Figure 15:
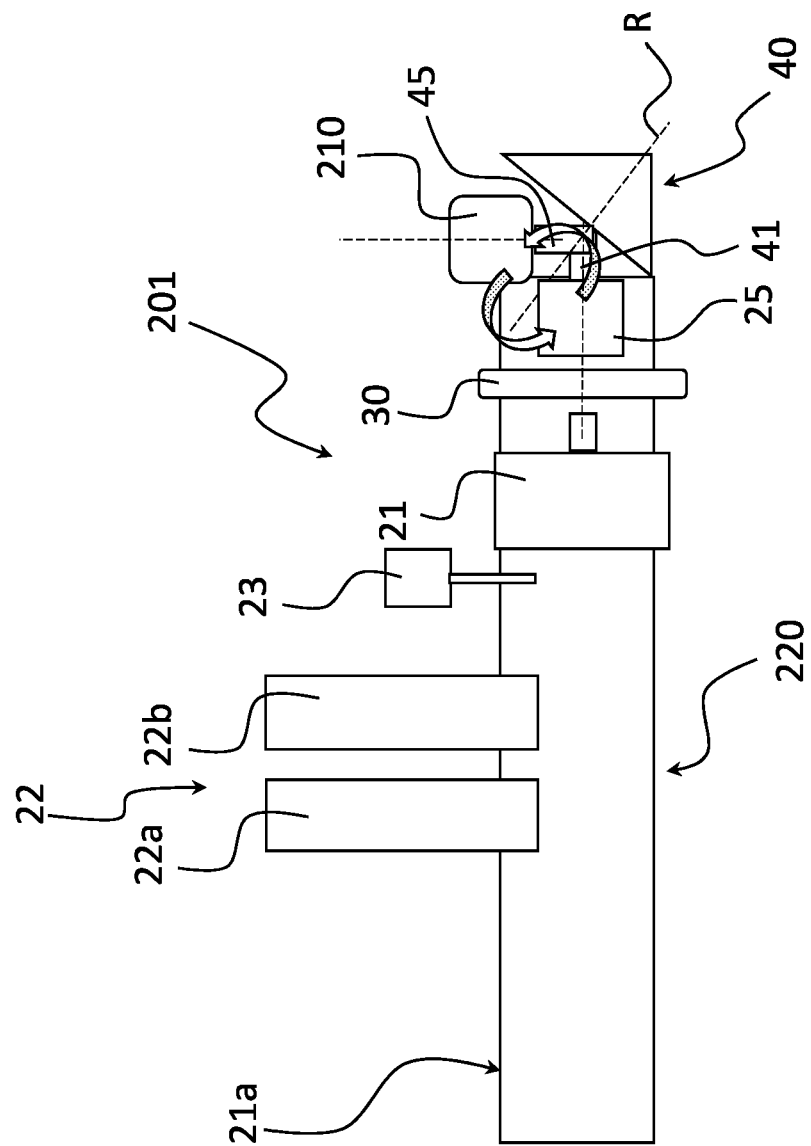

As shown in FIG. 15, at this point the moveable group 40b of the manipulator 40 is driven in rotation about the rotation axis R by an angle of 180°. Such a rotation causes a rotation of the support member 45 about the rotation axis R until it is brought to the waiting position previously occupied by the support member 41 and, simultaneously, a rotation of the support member 41 about the rotation axis R until it is brought to the loading/unloading position previously occupied by the support member 45. The forming drum 210 thus has its rotation axis oriented along a vertical direction and the forming drum 25 has its axis oriented along a horizontal direction, as shown in FIG. 19.

Figure 16:
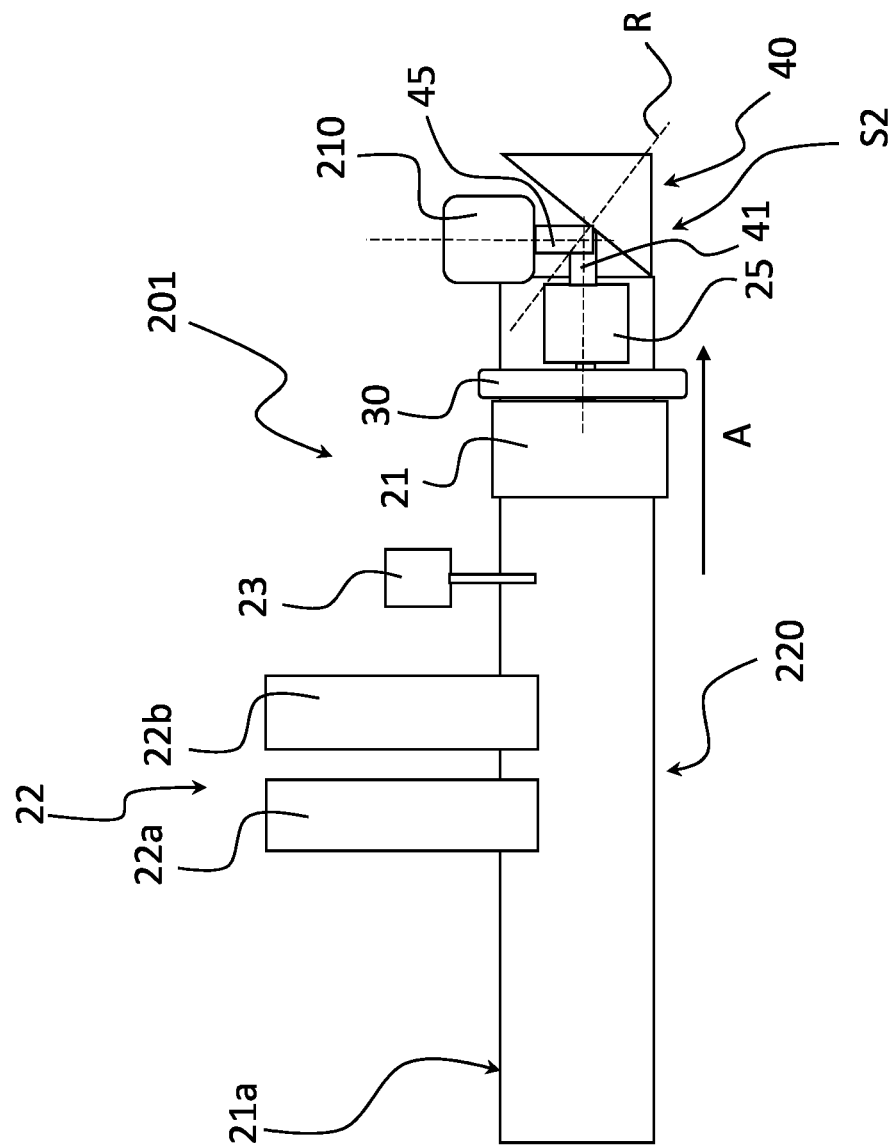

Thereafter, as shown in FIG. 16, the trolley 21 is moved along the direction of movement A so as to pick up the forming drum 25 from the support member 41.

Figure 17:
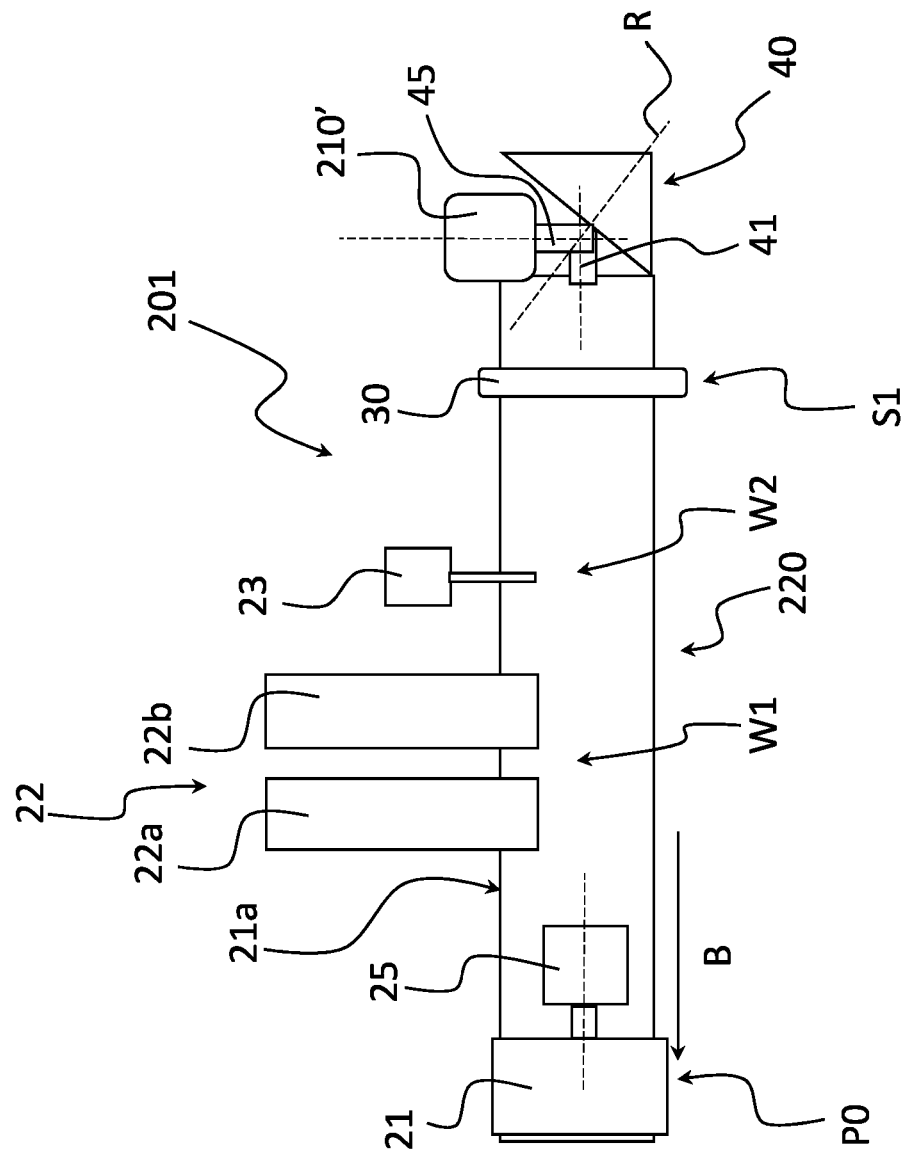

Thereafter, as shown in FIG. 17, the trolley 21 with the forming drum 25 is moved along the direction of movement B until it goes back to its starting position P0 (or to the first working area W1 in the case in which the starting position P0 is defined in the first working area W1). During such a movement the forming drum 25 passes in a radially inner position with respect to the annular holding member 30 without stopping in the first service area 51, in the second working area W2 and, in the case in which the starting position P0 is not defined in the first working area W1, in such a first working area W1.

Shortly before, or during or just after the movement of the trolley 21 to bring the forming drum 25 from the second service area S2 to the starting position P0 (or to the first working area W1 in the case in which the starting position P0 is defined in the first working area W1), the drum transfer device 221, shown in FIG. 2, picks up the forming drum 210 from the support member 45 to send it to the path 230 of the crown structures building line 200 and a new substantially toroidal forming drum 210', shown in FIG. 17, is arranged on the support member 45, preferably again by the drum transfer device 221.

The building device 201 of the belt assembly described above can thus proceed with a new building cycle of a belt assembly having a toroidal shaping, repeating the actions described above.

From the above description it is clear that in a normal operation of the plant of FIG. 2 a plurality of substantially toroidal forming drums 210, 210' enter into/exit from the belt assembly building device 201 in succession, whereas the forming drum 25 always remains inside such a building device 201.

Preferably, in the plant of FIG. 2 there are 5 or 6 substantially toroidal forming drums that circulate simultaneously in the crown structures building line 200.

Such forming drums have diameters, in the contracted configuration thereof, preferably comprised between 500 mm and 900 mm and allow a maximum radial expansion equal to 300 mm. Consequently, the annular holding member 30 must also be able to have a similar radial expansion.

Figure 21:
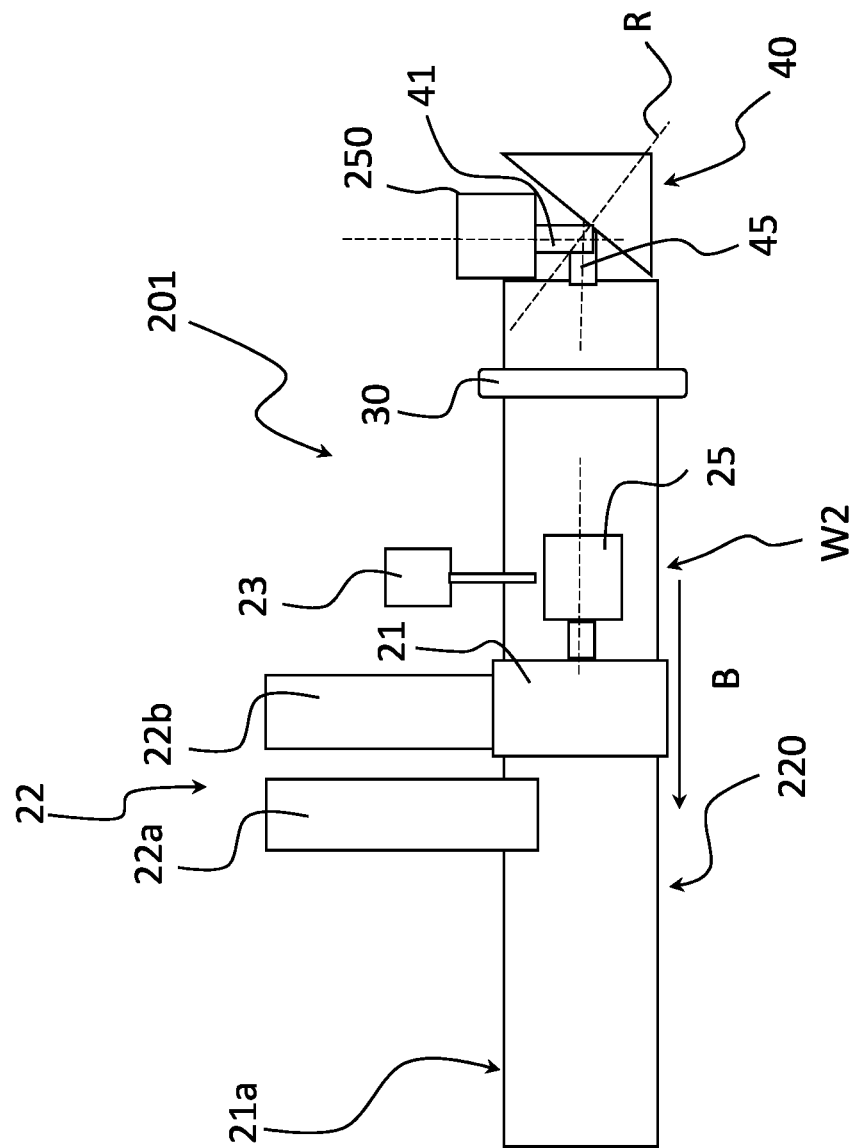
FIGS. 21 and 22 are schematic top views of a belt assembly building line of the plant of FIG. 2 in various operative configurations thereof taken during a cylindrical shaping of the belt assembly in accordance with the method of the invention.

When a cylindrical shaping of the belt assembly has to be carried out, the building device 201 of the belt assembly is configured to take an operating configuration that differs from the one shown in FIG. 3 only in that the support member 45 also supports a substantially cylindrical forming drum 250 which is totally equivalent to the forming drum 25 described earlier. The forming drum 250 is shown in FIG. 21.

Thereafter, the trolley 21 with the forming drum 25 is moved along the direction of movement A until the forming drum 25 is brought into the first working area W1.

In an analogous manner to what is shown in FIG. 4, the trolley 21 is stopped when the forming drum 25 is located at the first operative station W1a, where the first belt layer is deposited on the forming drum 25 by the deposition apparatus 22a.

In an analogous way to what is shown in FIG. 5, the trolley 21 is subsequently moved along the direction of movement A and stopped when the forming drum 25 is at the second operative station W1b, where the second belt layer is deposited on the forming drum 25 by the deposition apparatus 22b, in a radially outer position with respect to the first belt layer, thus building on the forming drum 25 the crossed belt structure.

Thereafter, as shown in FIG. 21, the trolley 21 is subsequently moved along the direction of movement A and stopped when the forming drum 25 reaches the second working area W2, where the zero degrees belt layer is deposited on the forming drum 25 by the deposition device 23, in a radially outer position with respect to the crossed belt structure, thus obtaining the desired cylindrical shaping of the belt assembly.

Figure 22:
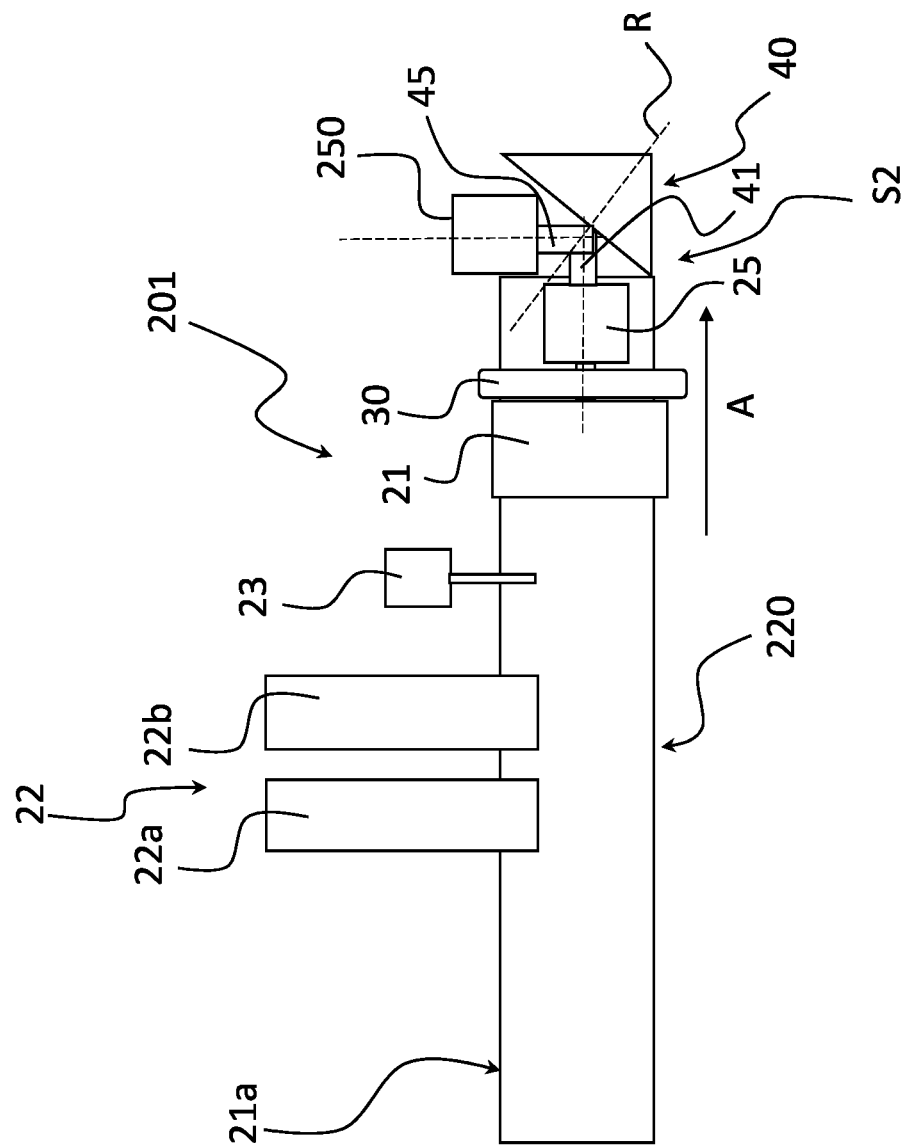

Thereafter, as shown in FIG. 22, the trolley 21 is moved along the direction of movement A until the forming drum 25, after having crossed the first service area S1, without stopping there and passing in a radially inner position with respect to the annular holding member 30, reaches the second service area S2, where it is transferred to the support member 41.

Thereafter, the trolley 21 is moved along the direction of movement B so as to move away from the second service area S2, in an analogous manner to what is shown in FIG. 8 (where however it should be understood that instead of the forming drum 210 there is the forming drum 250).

At this point the moveable group 40b of the manipulator 40 is driven in rotation about the rotation axis R by an angle of 180°, in an analogous manner to what is illustrated in FIG. 9 (here again being understood that instead of the forming drum 210 there is the forming drum 250). Such a rotation brings the forming drum 25 to the position originally occupied by the forming drum 250 and the latter to the position originally occupied by the forming drum 25. The forming drum 25 thus has its rotation axis oriented along a vertical direction and the forming drum 250 has its axis oriented along a horizontal direction.

Thereafter, the trolley 21 is moved along the direction of movement A so as to pick up the forming drum 250 from the support member 45, in an analogous manner to what is illustrated in FIG. 10 (here again being understood that instead of the forming drum 210 there is the forming drum 250).

Thereafter, the trolley 21 with the forming drum 250 is moved along the direction of movement B until it goes back to its starting position P0 (or to the first working area W1 in the case in which the starting position P0 is defined in the first working area W1). During such movement the forming drum 250 passes in a radially inner position with respect to the annular holding member 30 without stopping in the first service area S1, in the second working area W2 and in the first working area W1.

Shortly before, or during or just after the movement of the trolley 21 to bring the forming drum 250 from the second service area S2 to the starting position P0 (or to the first working area W1 in the case in which the starting position P0 is defined in the first working area W1), the drum transfer device 221, shown in FIG. 2, picks up the forming drum 25 from the support member 41 to send it to the path 230 of the crown structures building line 200 and on the support member 41 is arranged, preferably again by the drum transfer device 221, a further substantially cylindrical forming drum, also totally equivalent to the forming drum 25 described earlier, in the case in which a cylindrical shaping of a new belt assembly has to be carried out, or a substantially toroidal forming drum, like for example the forming drum 210, 210' shown in FIGS. 3-17, in the case in which a toroidal shaping of the belt assembly has to be carried out.

The present invention has been described with reference to some preferred embodiments. Different modifications can be made to the embodiments described above, while remaining within the scope of protection of the invention defined by the following claims.

The invention claimed is:

1. A method for building belt assemblies for tyres for vehicle wheels, comprising:
building a crossed belt structure on a substantially cylindrical first forming drum in a first working area;
selecting, according to a type of tyre to be produced, whether to build a belt assembly having a cylindrical shaping or a belt assembly having a toroidal shaping;
wherein, in order to build a belt assembly having a cylindrical shaping, said method comprises:
depositing at least one zero degrees belt layer on said first forming drum in a radially outer position with respect to said crossed belt structure, and in a second working area arranged downstream of said first working area with reference to a first movement direction;
and wherein, in order to build a belt assembly having a toroidal shaping, said method comprises:
picking up said crossed belt structure from said first forming drum;
toroidally shaping said crossed belt structure in a first service area arranged downstream of said second working area with reference to said first movement direction;
transferring said toroidally shaped crossed belt structure onto a second forming drum; and
depositing at least one zero degrees belt layer on said second forming drum in a radially outer position with respect to said toroidally shaped crossed belt structure, and in the second working area arranged downstream of said first working area with reference to said first movement direction.

2. The method according to claim 1,
wherein, in order to build the belt assembly having the cylindrical shaping, said first forming drum is moved along said first movement direction from said first working area to said second working area and from said second working area to a second service area arranged downstream of said first service area with reference to said first movement direction, and
wherein during the movement from said second working area to said second service area the first forming drum passes through said first service area without stopping at said first service area.

3. The method according to claim 1, wherein, in order to build the belt assembly having the toroidal shaping, said first forming drum is moved along said first movement direction from said first working area to said first service area passing through said second working area without stopping at said second working area.

4. The method according to claim 3, wherein, in order to build the belt assembly having the toroidal shaping, said second forming drum is moved from said first service area to said second working area along a second movement direction opposite to said first movement direction.

5. The method according to claim 4, wherein, in order to build the belt assembly having the toroidal shaping, after having moved said second forming drum from said first service area to said second working area, said second forming drum is moved from said second working area along said first movement direction passing through said first service area without stopping at said first service area.

6. The method according to claim 5, wherein, in order to build the belt assembly having the toroidal shaping, before moving said second forming drum from said first service area to said second working area, said second forming drum is moved from a second service area to said first service area along said second movement direction, wherein said second service area is arranged downstream of said first service area with reference to said first movement direction.

7. The method according to claim 1, wherein toroidally shaping said crossed belt structure comprises:
transferring said crossed belt structure from said first forming drum to an annular holding member.

8. The method according to claim 7, wherein said annular holding member is arranged in said first service area.

9. The method according to claim 8, wherein toroidally shaping said crossed belt structure comprises:
arranging said second forming drum in a radially inner position with respect to said annular holding member.

10. The method according to claim 9, wherein toroidally shaping said crossed belt structure comprises, after having arranged said second forming drum in the radially inner position with respect to said annular holding member:
radially expanding said second forming drum until said second forming drum reaches an expanded condition in which said second forming drum is in contact with said crossed belt structure and deforms said crossed belt structure until said crossed belt structure assumes a toroidal shape.

11. The method according to claim 7, wherein transferring said crossed belt structure from said first forming drum to said annular holding member comprises:
arranging said first forming drum in a radially inner position with respect to said annular holding member.

12. The method according to claim 11, wherein transferring said crossed belt structure from said first forming drum to said annular holding member comprises:
   radially contracting said annular holding member until said annular holding member is brought into contact with said crossed belt structure.

13. The method according to claim 12, wherein transferring said crossed belt structure from said first forming drum to said annular holding member comprises, after having radially contracted said annular holding member:
   radially contracting said first forming drum leaving said crossed belt structure-associated with said annular holding member.

14. The method according to claim 1, wherein said second forming drum is substantially toroidal.

* * * * *